(12) United States Patent
Carter et al.

(10) Patent No.: US 6,305,880 B1
(45) Date of Patent: *Oct. 23, 2001

(54) DEVICE AND METHOD FOR TRENCHLESS REPLACEMENT OF UNDERGROUND PIPE

(75) Inventors: Robert Ward Carter, San Francisco; Robert Williams Carter, Oakland, both of CA (US)

(73) Assignee: WRB Company, Inc., Oakland, CA (US)

( * ) Notice: Subject to any disclaimer, the term of this patent is extended or adjusted under 35 U.S.C. 154(b) by 0 days.

(21) Appl. No.: 09/350,948

(22) Filed: Jul. 9, 1999

Related U.S. Application Data

(63) Continuation-in-part of application No. PCT/US98/00266, filed on Jan. 9, 1998.
(60) Provisional application No. 60/035,174, filed on Jan. 9, 1997.

(51) Int. Cl.$^7$ .................................. E02F 5/10; E03F 3/06
(52) U.S. Cl. .......................................... 405/184.3; 175/53
(58) Field of Search ..................................... 405/154–156, 405/184, 184.1, 184.3, 154.1, 155; 175/53

(56) References Cited

U.S. PATENT DOCUMENTS

| Re. 35,542 | * | 6/1997 | Fisk et al. ............................. 405/156 |
| 652,367 | | 6/1900 | Law . |
| 928,361 | | 7/1909 | Cockburn . |
| 1,001,205 | | 8/1911 | Lovell . |

(List continued on next page.)

FOREIGN PATENT DOCUMENTS

| 295 21 163U1 | 1/1997 | (DE) . |
| 0 094 694 | 11/1983 | (EP) . |
| 2 475 805 | 8/1981 | (FR) . |

OTHER PUBLICATIONS

D.J. Ryan and Sons Pipeline Insertion Machine literature, 1983.
Power Ram Rod Pusher/Puller Literature, Models 1915 (2 pgs), Model 1425–Mini–Ram I (2 pgs), Model 1825—Mini–Ram–II (2 pgs), Model 2020 (2 pgs), Model 7000 (4 pgs) (undated).
Vermeer Hydroburst Pipe–Bursting Process (6 pgs) (undated).
Power Team Post Tensioning Ram (PTR) Literature (3 pgs) (undated).
Grundoburst Service System (3 pgs) (undated).
Pipe Bursting Replaces Sewer Lines (10/97) (2 pgs) (undated).
Pipe Bursting Water Mains Surges in N. America (10/96) (3 pgs) (undated).
Service Line Splitting and Extraction with Grundocrack, Jr. (7 pgs) (undated).

*Primary Examiner*—David Bagnell
*Assistant Examiner*—Tara L. Mayo
(74) *Attorney, Agent, or Firm*—Robert O. Guillot; Oppenheimer Wolff & Donnelly LLP

(57) ABSTRACT

The basic features of the invention include a pipe parting mole, a length of cable that is engagable to the mole, a cable pulling device and a cable pulling device engagement frame that provides a mounting structure for the cable pulling device. The cable pulling device engagement frame generally includes a reaction plate and an annulus member for removably engaging the cable pulling device with the frame. The frame is configured for the sideways engagement of the cable within the frame and the annulus member. Two pairs of cable engagement collets are preferably utilized; a first pair being disposed within the cable pulling device to engage the cable on a pulling stroke, and a second pair may be disposed within the frame or the cable pulling device to engage the cable on a recovery stroke. The cable pulling device is preferably a post tensioning ram (PTR).

27 Claims, 18 Drawing Sheets

U.S. PATENT DOCUMENTS

| | | |
|---|---|---|
| 1,519,882 | 12/1924 | Stewart et al. . |
| 1,618,368 | 2/1927 | Dietle . |
| 1,638,494 | 8/1927 | Lewis et al. . |
| 1,717,588 | 6/1929 | Small . |
| 1,719,449 | 7/1929 | Rauko . |
| 2,163,384 | 5/1939 | Stevens . |
| 2,203,158 | 6/1940 | Klein . |
| 2,360,425 | 10/1944 | Kinzbach . |
| 2,392,495 | 1/1946 | Nameth . |
| 2,502,711 | 4/1950 | Evans . |
| 2,534,858 | 12/1950 | Ellis . |
| 2,598,930 | 6/1952 | Murphy . |
| 2,638,165 | 5/1953 | Barber . |
| 2,662,276 | 12/1953 | Sheaffer . |
| 2,803,301 | 8/1957 | Warner et al. . |
| 2,834,106 | 5/1958 | Conder . |
| 2,846,193 | 8/1958 | Chadderdon . |
| 2,947,253 | 8/1960 | Cirilo . |
| 2,983,042 | 5/1961 | Frantz et al. . |
| 2,999,541 | 9/1961 | Kinzbach et al. . |
| 3,005,493 | 10/1961 | Crowe et al. . |
| 3,023,040 | 2/1962 | Cawley et al. . |
| 3,073,389 | 1/1963 | Conner . |
| 3,114,416 | 12/1963 | Kammerer . |
| 3,181,302 | 5/1965 | Lindsay . |
| 3,341,930 | 9/1967 | Belanger . |
| 3,543,377 | 12/1970 | Bremner . |
| 4,003,122 | 1/1977 | Overmyer et al. . |
| 4,100,980 | 7/1978 | Jenne . |
| 4,118,940 | 10/1978 | Beane . |
| 4,505,302 | 3/1985 | Streatfield et al. . |
| 4,693,404 | 9/1987 | Wayman et al. ............. 225/103 |
| 4,720,211 | 1/1988 | Streatfield et al. . |
| 4,738,565 | 4/1988 | Streatfield et al. . |
| 4,928,866 | 5/1990 | Carruthers ................. 225/106 |
| 5,997,215 | 12/1999 | Schwert ..................... 405/184 |
| 6,109,832 * | 8/2000 | Lincoln ....................... 405/184 |

\* cited by examiner

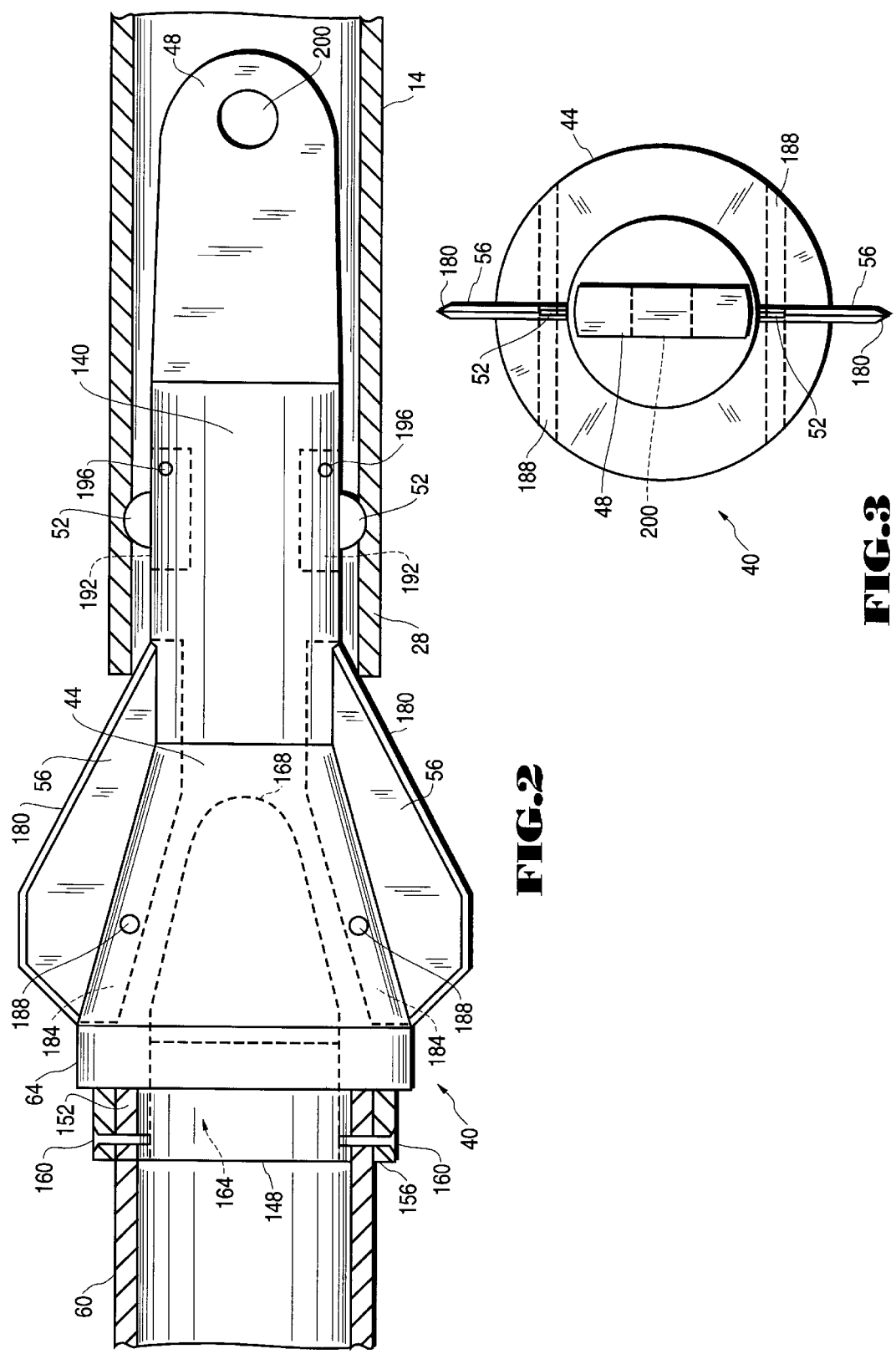

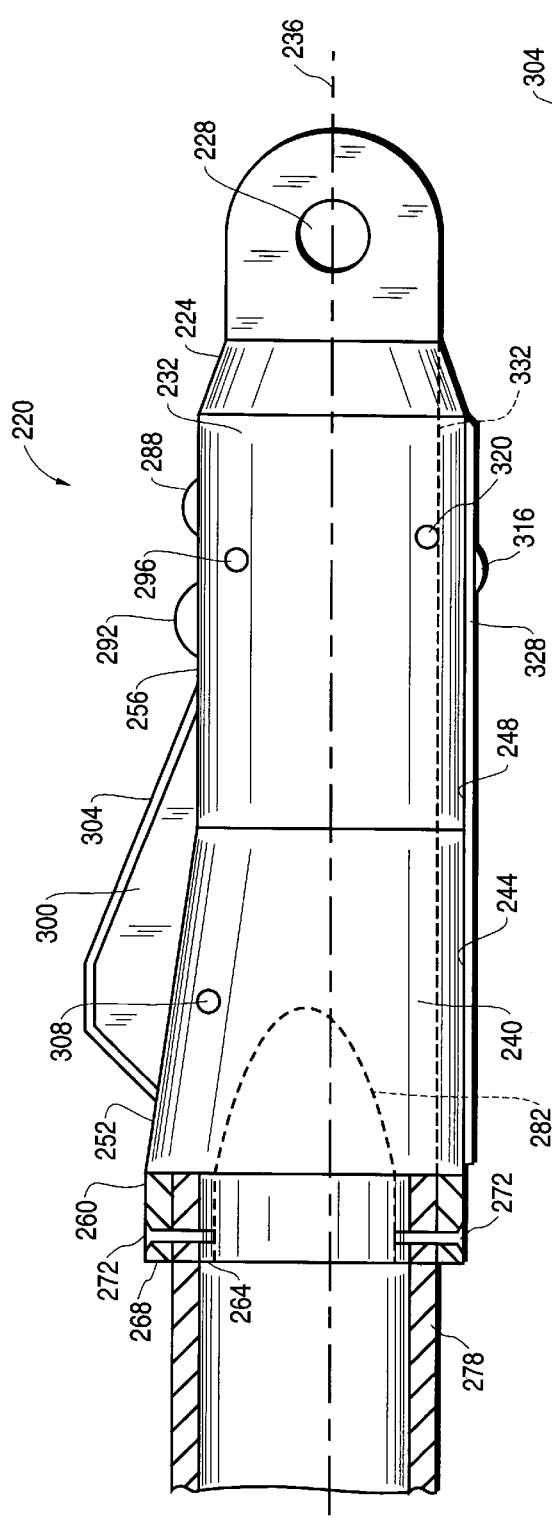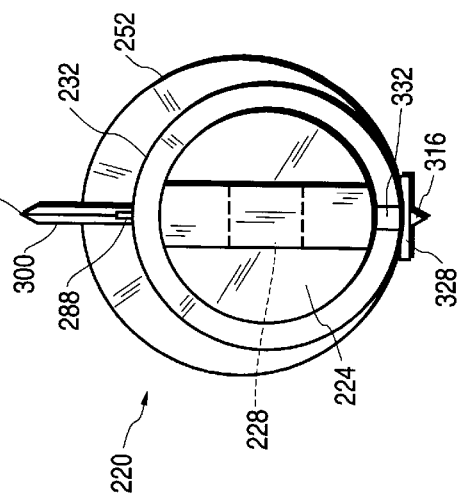

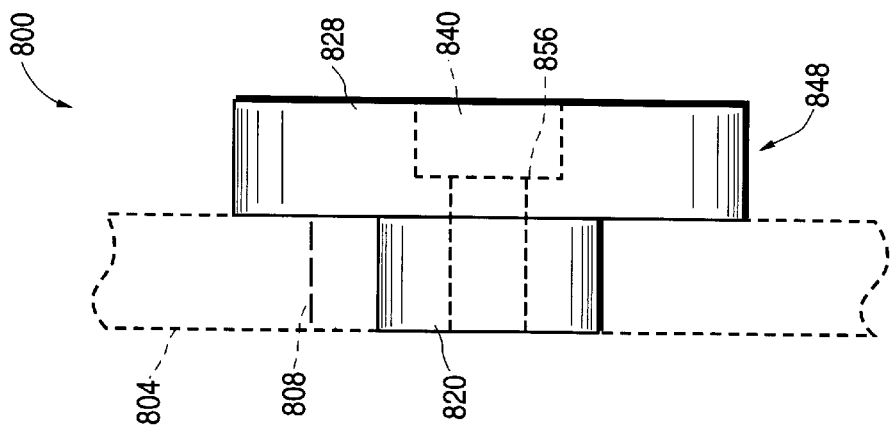
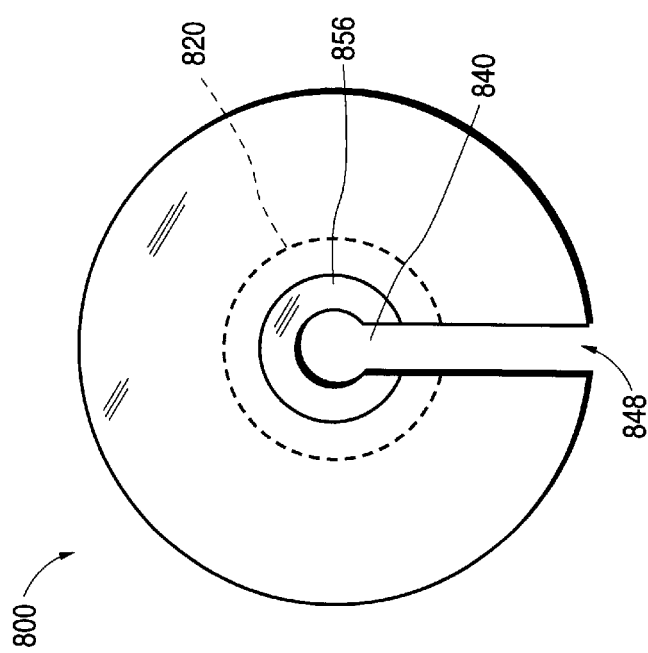

DEVICE AND METHOD FOR TRENCHLESS REPLACEMENT OF UNDERGROUND PIPE

CROSS-REFERENCE TO RELATED APPLICATIONS

The present invention is a continuation-in-part application, based upon and claiming priority to pending International Patent Application Serial No. PCT/US98/00266, filed Jan. 9, 1998 by the inventors hereof; which application claims priority to U.S. Provisional Patent Application Serial No. 60/035,174, filed Jan. 9, 1997 by the inventors hereto to which priority is claimed.

BACKGROUND OF THE INVENTION

1. Field of the Invention

The present invention relates generally to devices and methods for the trenchless replacement of underground pipes and more particularly to pipe splitting devices and cable pulling devices and methods for splitting and expanding existing pipe to facilitate the replacement thereof with new pipe.

2. Description of the Prior Art

Trenchless technology for the replacement of underground pipe is not new, and the standard equipment and methods generally used are well known. This standard equipment for this technology is very large, heavy, and therefore requires additional large, heavy duty equipment for the transportation to, and the placement thereof on site, and the operation thereof on site.

There are several methods of propelling a pipe bursting, and/or cracking and expanding device, and pulling a new pipe through an existing pipe The most commonly used methods are large cable winches, and/or rod pushers or pullers that are usually hydraulically powered, and often used with a pneumatic percussive device helping to drive the pipe breaking device. Winches give continuous motion during pulling, while rod pushers/pullers generally give cycled motion in which they pull, then a rod must be either added or removed, before the return stroke, and next pull stroke. Sometimes rod pushers are converted to cable pullers, eliminating the need for rod removal.

Winches and rod pushers/pullers that can produce pulling forces of up to 75 tons can themselves weigh 2 to 5 tons and must be handled and placed in position to pull; they are powered by correspondingly heavy duty equipment, cranes, trucks, and back-hoes, etc. They also need large excavations, such that the support equipment can take up enough room so as to create traffic problems and even require street closures.

This also means that only large companies with large financial resources can afford the equipment necessary to replace underground pipes, and because the costs and maintenance on this equipment can be high, their prices are also high. Therefore the use of this prior art trenchiess technology has been limited mainly to the 6 inch or above size pipe of municipal or corporate supply and sewer lines, and is used mainly by large contractors.

SUMMARY OF THE INVENTION

The basic components of the invention include a pipe parting mole, a length of cable that is engagable to the mole, a cable pulling device and a cable pulling device engagement means that provides a mounting structure for the cable pulling device. The cable pulling device engagement means generally includes a reaction plate and a structure for removably engaging the cable pulling device therewithin. A cable pulling frame may be advantageously used to facilitate the removal of the cable from a relatively small hole that is created at the pulling end of the pipe.

The equipment of this invention, is of modular design and needs no bolting, or tools to assemble. It will fit into an excavation hole that is 2 feet wide and 3.5 feet long, for the small pullers (24 tons) and 2'×4.5 feet long for the largest puller (75+tons) the entrance hole for the replacement pipe need be only as long as the radius bend, that the polyethylene pipe size used, requires.

The components of the present invention can be easily built in several sizes according to the strength of the cable to be pulled, and componentized, so that no component weighs more than 75 lbs. One may can now move all the equipment necessary to pull up to 150,000 pounds (75 tons), in one average sized pick-up truck and hand carry it to remote areas normally inaccessible to the larger prior art equipment. The present invention has particular applications in the vast 4" diameter home lateral pipe field, which has, up to now been relatively untouched by the trenchless method of pipe replacement.

These and other features and advantages of the present invention will be well understood by those of ordinary skill in the art upon reading the following detailed description of the preferred embodiment.

IN THE DRAWINGS

FIG. 2 is a side elevational view of a first pipe splitting device or mole of the present invention;

FIG. 3 is an end elevational view of the mole depicted in FIG. 2;

FIG. 4 is a side elevational view of an alternative mole of the present invention;

FIG. 5 is an end elevational view of the mole depicted in FIG. 4;

FIG. 17 is an end elevational view of the annulus member depicted in FIG. 16;

FIG. 18 is a side elevational view of the annulus member depicted in FIG. 17;

DETAILED DESCRIPTION OF THE PREFERRED EMBODIMENTS

Figure 1:
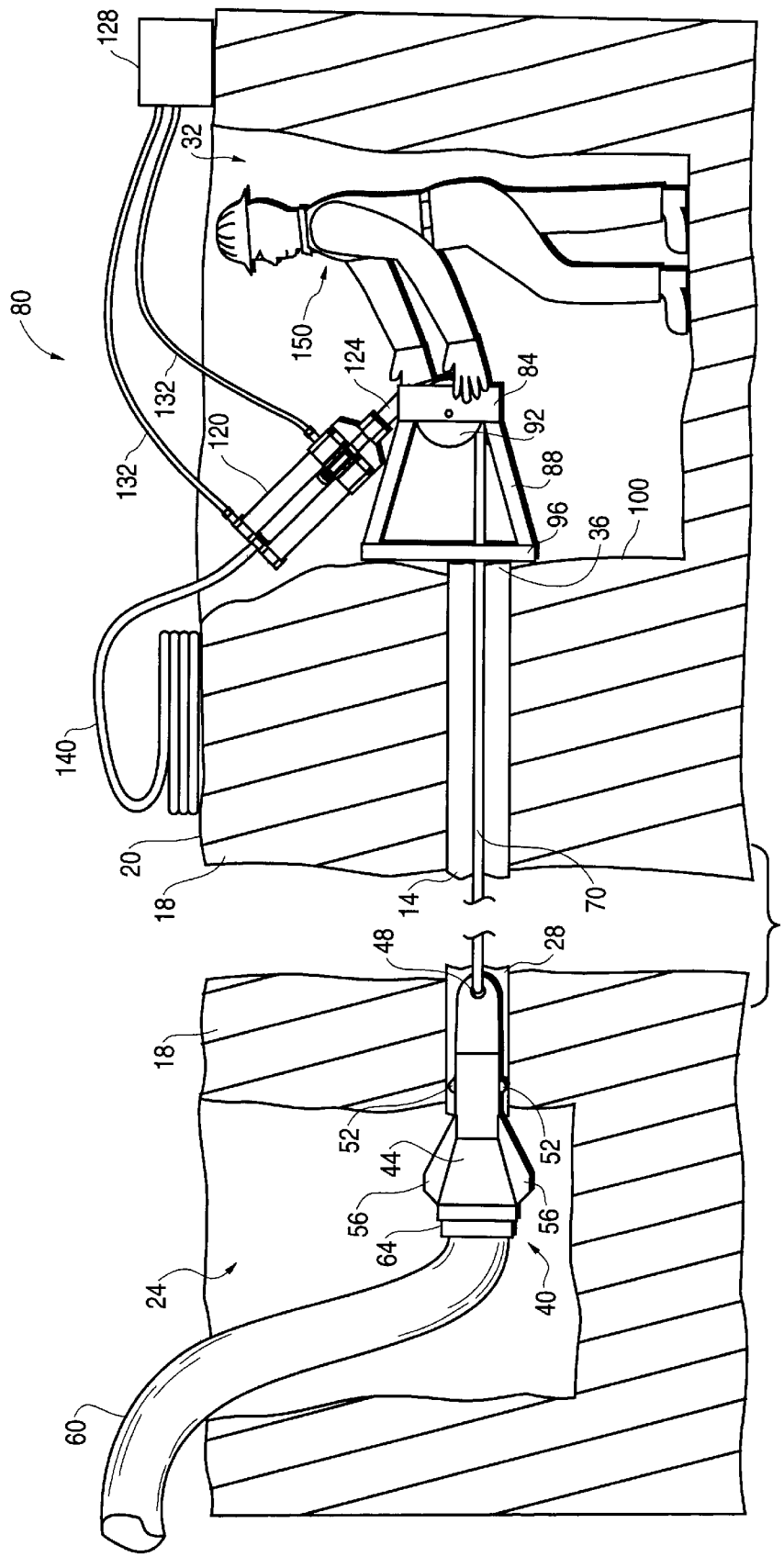
FIG. 1 is a side elevational view depicting the utilization of the present invention in a trenchless replacement operation.

FIG. 1 is a side elevational view depicting the use of the trenchless pipe replacement device of the present invention. As depicted therein, an existing pipe 14 that is being replaced is disposed within earth 18 beneath the ground level surface 20. A first hole 24 has been dug to reveal a first end 28 of the pipe 14, and a second hole 32 has been dug to reveal a second end 36 of the pipe 14. A pipe parting and expanding device 40 referred to herein as a mole, is inserted within the first pipe end 28. The mole 40 includes a generally tapered body portion 44, a nose portion 48, one or more pipe scoring wheels 52 and one or more pipe parting fins or blades 56 disposed along the body portion 44. A length of replacement pipe 60 is removably engaged to the rearward end 64 of the body portion 44 of the mole 40. A detailed description of the mole 40 is presented herebelow.

A mole pulling cable 70 is passed from the second end of the pipe 36, through the pipe 14 to a pinned engagement with the nose 48 of the mole 40. The cable 70 is utilized to pull the mole 40 through the pipe 14, parting and enlarging the pipe 14 as it is pulled therethrough. The replacement pipe 60 is pulled behind the mole 40, such that when the mole 40 has been pulled entirely through the pipe 14, the replacement pipe 60 will reside in place within the parted, expanded pipe 14 to functionally replace it.

A light weight cable pulling system, generally designated 80, is disposed within the second hole 32 proximate the second end 36 of the pipe 14. The preferred cable pulling system 80 includes a cable pulling frame member 84 having leg members 88 and a rotatable cable pulley 92 mounted thereto. A frame bracing reaction plate 96 is positioned against the side wall 100 of the hole 32 to provide a strong, firm surface for reactive cable pulling forces, as described herebelow. The reaction plate 96 is formed with a cable passage slot 104 (not shown in FIG. 1) for passage of the cable 70 therethrough. The cable 70 therefore passes through the plate slot 104 and around the cable pulley 92 to a cable pulling device 120 that is next described.

The cable pulling device 120 is removably mounted to a generally cylindrical, slotted mounting socket or annulus 124 that is fixedly engaged to the frame 84. The cable pulling device 20 is preferably a hydraulic device which is operated utilizing a portable hydraulic pump 128 having hydraulic lines 132 leading therefrom to the cable pulling device 120. The cable pulling device 120 includes a cable pulling collet which releasably engages the cable for repeatable short pulling strokes. End portions of the cable 70 may be disposed in a coil 140 upon the ground surface 20.

It is therefore to be understood that an operator 150, having engaged the cable 70 to the mole 40, will pass the cable through the plate slot 104, around the pulley 92 into the slotted annulus 124 and into operative engagement within the cable puller 120 that is mounted in the socket 124. Thereafter, the operator 150 will activate the pump 128 and then activate the cable puller 120 to complete a first cable pulling stroke of perhaps 3 to 6 inches depending upon the travel of the hydraulic pulling device 120, as is discussed in greater detail herebelow. Repeated pulling strokes of the puller 120 ultimately pulls the mole 40 entirely through the pipe 14, until the mole 40 protrudes past the second end 36 of the pipe 14, whereupon the replacement pipe 60 has been pulled entirely through the parted, expanded pipe 14, in operational replacement thereof. The mole 40 is then disengaged from the replacement pipe 60. The cable pulling system 80 is then removed from the hole 32, appropriate pipe fixturing and jointing is accomplished at both ends of the replacement pipe, and the holes 24 and 32 can then be refilled.

It is therefore to be understood that the modular, light weight, pipe replacement system of the present invention allows a single worker to easily take all steps necessary to accomplish the replacement of a length of buried, pre-existing pipe. The various components of the system, the mole 40, the replacement pipe 60, the cable 70, the plate 96, the frame 92, the cable pulling device 120 and the pump 128 are all compact, light weight components that can be easily transported in a light duty pickup truck, and hand carried to, placed and assembled into the pulling hole by one man.

A first preferred mole of the present invention is depicted in FIGS. 2 and 3, wherein FIG. 2 is a side elevational view and FIG. 3 is an end view taken from the nose 48 of the mole 40. Components of the mole previously identified are numbered identically. As depicted in FIGS. 2 and 3, the mole 40 includes a generally tapered nose portion 48, having a cable engagement bore 136 formed therethrough. The mole 40 further includes a generally cylindrical center portion 140, the tapered body portion 44, and the rear portion 64 which includes an integrally formed, rearwardly projecting cylindrical replacement pipe attachment shoulder 148. As is best seen in FIG. 2, the end 152 of the length of replacement pipe 60 fits over the shoulder 148 and a cylindrical pipe retaining sleeve 156 is placed outside of the pipe end 152. A plurality of pipe engagement screws 160 which project through the sleeve 156 and through holes formed in the end 152 of the pipe 60, are threadably engaged within the rearwardly projecting shoulder 148. Through use of the sleeve 156 and screws 160, the end 152 of the pipe 60 is removably engaged to the rearward portion 64 of the mole 40. A bore 164 is preferably formed within the rearward end 64 of the mole 40. The bore 164 has inwardly tapered sidewalls 168 for a mating engagement with a tapered forward end of a standard impact driver (not shown). The use of such an impact driver to percussively drive a mole forward into a pipe is well known in the prior art. The inventors have found that the use of an impact driver is not necessary to part and replace ordinary lengths of pipe. However, where the pipe includes various types of clamps and joints that can strengthen the pipe at the location of such clamps and joints, the use of an impact driver to aid in moving the mole 40 through the pipe, may be beneficial.

The pipe parting blades 56 are preferably disposed within a blade holding slot 184 formed in the tapered body 44 and cylindrical section 140 of the mole 40, and blade retaining pins 188 are disposed in retaining pin bores formed through the tapered portion 44 and the inner portions of the blades 56. The blades 56 are preferably formed of a hardened steel and are sharpened on the outer edge 180 to facilitate the pipe parting function of the blades 56.

The pipe scoring wheels 52 are preferably engaged in a scoring wheel holding member that is disposed within a scoring wheel slot 192 cut into the cylindrical portion 140 of the mole 40, and retaining pins 196 which project through retaining pin bores are utilized to hold the scoring wheel mechanisms in place. It is therefore to be understood that both the scoring wheels 52 and the blades 56 are removably engagable with the mole 40, such that they can be easily replaced when it is necessary to do so.

An alternative mole 220 is depicted in FIGS. 4 and 5, wherein FIG. 4 is a side elevational view and FIG. 5 is an end elevational view. The mole 220 includes a tapered nose portion 224 having a cable engagement bore 228 formed therethrough. A generally cylindrical body portion 232 having a central axis 236 is integrally formed with the nose portion 224. A non-concentrically tapered body portion 240 is formed rearwardly of the cylindrical portion 232. The tapered portion 240 is excentrically formed such that one external surface 244 is a straight line extension of the cylindrical surface 248 of the cylindrical portion 232. The opposite surface 252 of the tapered portion 240 is flared outwardly relative to the surface 256 of the cylindrical portion 232. It is therefore to be understood that the surfaces 244, 248 and 256 are parallel to the center line 236, whereas the surface 252 diverges from the center line 236 toward the rearward portions of the mole 220.

A rearward portion 260 of the mole 220 includes a rearwardly extending replacement pipe engagement shoulder 264 and a pipe engagement sleeve 268, which together cooperate with pipe retaining screws 272 to hold a leading edge of a section of replacement pipe 278. A generally tapered impact driver bore 282 is preferably formed in the rearward end 260 of the mole 220 to provide a mating engagement with a tapered nose portion of an impact driver (not shown), as has been described hereabove with regard to mole 40, depicted in FIGS. 2 and 3. A pair of pipe scoring wheels 288 and 292 are disposed in a scoring wheel retaining mechanism that is held in place by a pin 296. The pipe scoring wheels 288 and 292 are preferably arranged such that the first wheel 288 scores the pipe a first distance into its interior wall, and the second scoring wheel 292 scores the pipe in the same track an additional distance into the interior wall of the pipe to facilitate the parting of the pipe. A pipe parting blade 300 having a sharpened edge 304 is disposed within the tapered side 252 of the mole 220 to part the pipe along the line scored by the wheels 288 and 292. A blade retaining pin 308 facilitates the replaceable engagement of the blade 300 with the mole 220. In the preferred embodiment, another pipe scoring wheel 316 is disposed on the straight, opposite side of the mole 220 from the two scoring wheels 288 and 292. The pipe scoring wheel 316 is replaceably engaged utilizing a wheel retaining pin 320 in the manner previously described herein. Additionally, a hardened steel skid plate 328 is engaged to the straight side of the mole 220 utilizing an engagement slot 332 that is formed axially into the lower surface of the mole 220. The scoring wheel 316 further facilitates the parting of the pipe when it is expanded by the non-concentric tapered portion 240, and the hardened steel skid plate 328 provides a longer useful lifetime to the mole 220. A cable pulling frame 84 is next described.

Figure 6:
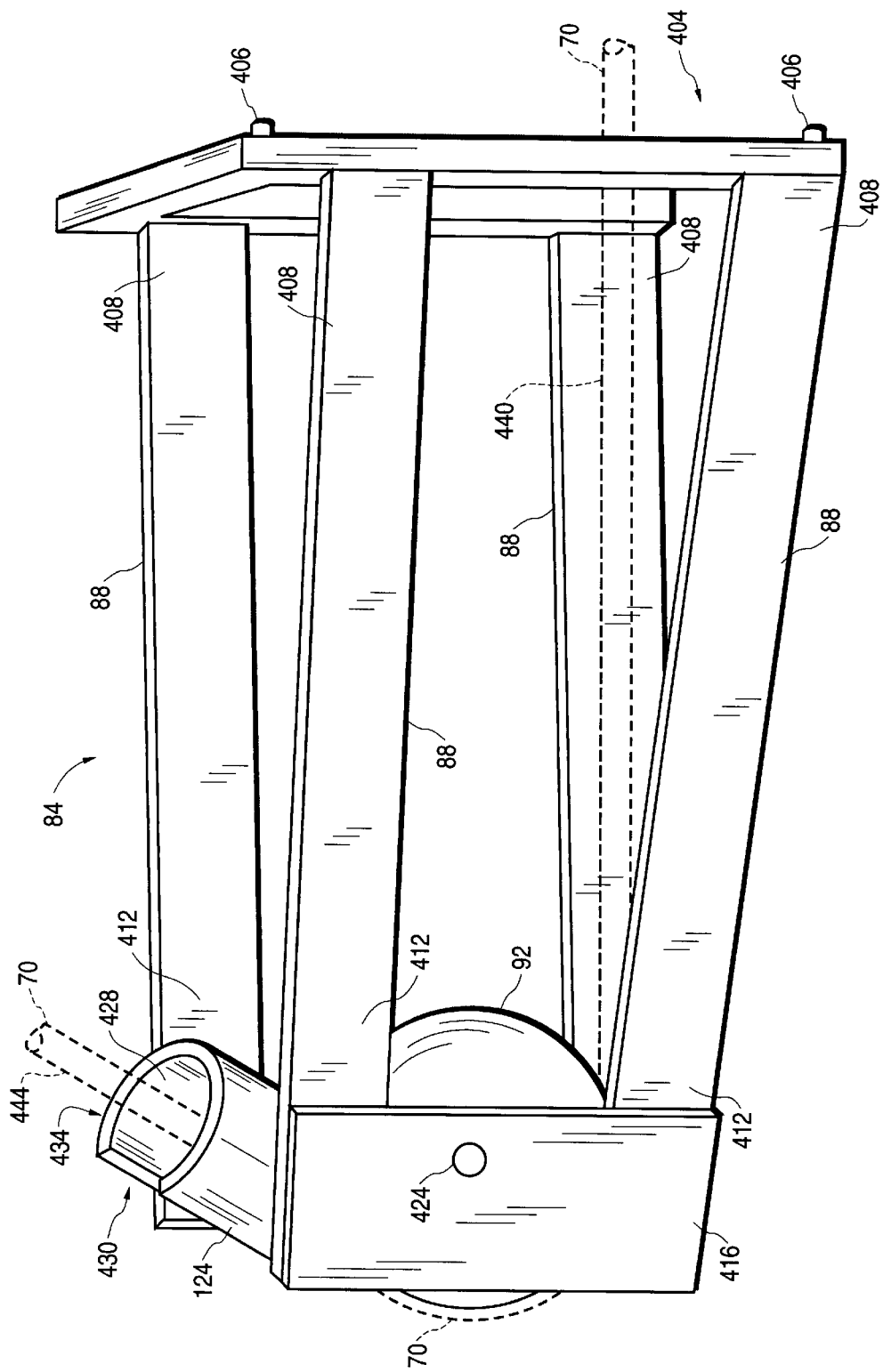
FIG. 6 is a side elevational view of a four legged cable pulling frame of the present invention.
Figure 7:
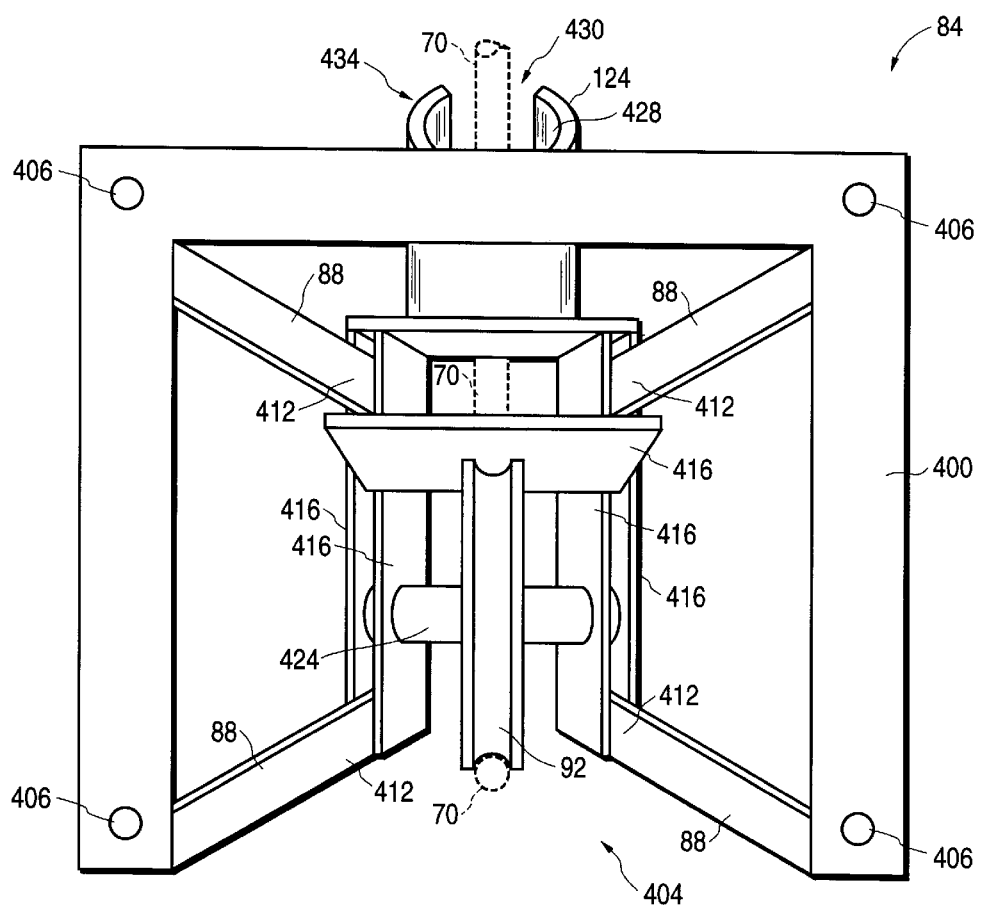
FIG. 7 is an end elevational view of the cable pulling frame depicted in FIG. 6.
Figure 11:
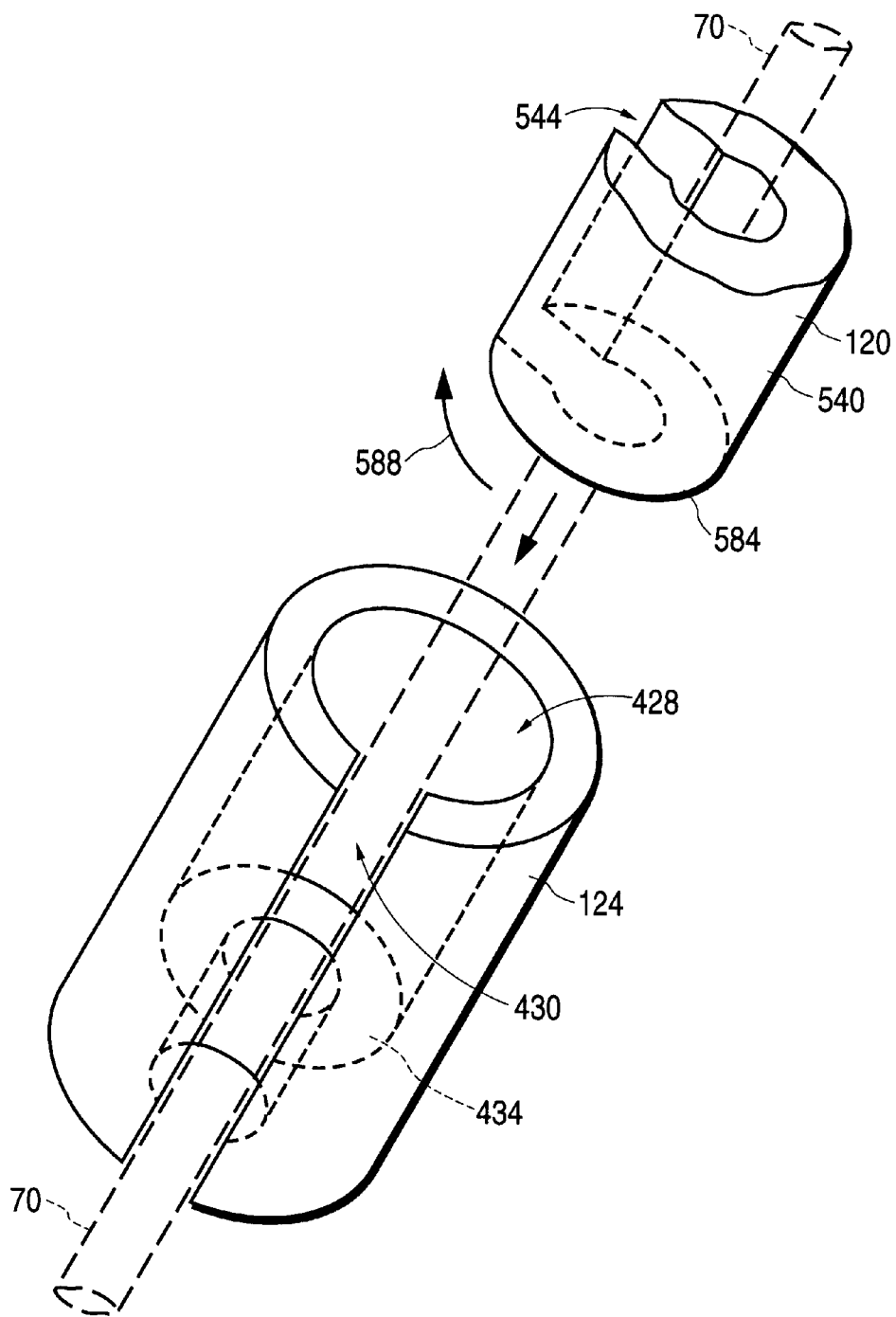
FIG. 11 is a perspective view depicting the insertion of the cable pulling device nose piece within an annulus member.

The cable pulling frame 84 as depicted in FIGS. 6 and 7, includes a generally U-shaped base member 400 which is preferably made from three pieces of rectangular steel stock that are welded together at their ends. Significantly, a fourth frame member that would create a square base is omitted, such that a gap 404 is provided. The gap 404 facilitates the placement of the frame 84 onto an existing length of cable 70 that projects outwardly from the end 36 of the pipe 14. A plurality of reaction plate alignment pins 406 project from the base member 400 for the aligned engagement of the frame 84 with the reaction plate 96, as is described hereinbelow. An inner end 408 of each of the leg members 88 is engaged, such as by welding, to a corner of the U-shaped base member 400 to create a stable frame structure. The outer ends 412 of the leg members 88 are engaged together by frame members 416, such as by welding, to form a strong stable structure. The leg members 88 and frame members 416 are preferably made from rectangular, tubular steel stock. The cable pulley 92 is rotatably mounted to an axle 424 that is engaged to the frame members 416. The annulus 124 is a generally cylindrical tubular member having a cable passage bore 428 formed therethrough, and an outer portion of its sidewall is removed to form a cable passage slot 430. The slot 430 functions such that the cable 70 may be placed into bore 428 of the annulus 124 from its side through the slot 430; whereby it is not necessary to thread the end of the cable through the annulus 124. As is best seen in FIG. 11 and described in detail hereinbelow, a mounting shoulder 434 projects into the slotted bore 428 of the annulus 124 to facilitate the removable mounting of the cable pulling device 120 therewithin.

Figure 8:
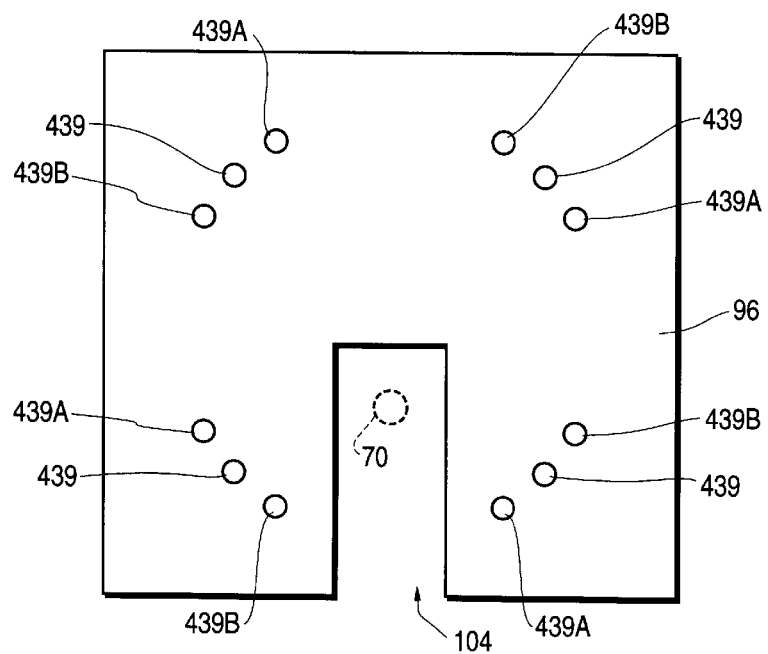
FIG. 8 is a side elevational view of a frame mounting plate of the present invention.

The frame bracing reaction plate 96 of the present invention is depicted in FIG. 8. The reaction plate is a generally rectangular or square flat member that is preferably formed from a strong, light weight metal, such as an aluminum alloy. The reaction plate serves to provide a firm footing for the base member 400 of the cable pulling frame 84; thus, the plate 96 is formed with a sufficient thickness to reactively withstand the cable pulling forces that the frame 84 places against the wall 100 of the pipe access hole 32. A cable passage slot 104 is formed from a side of the plate 96 towards its center. The slot 104 permits the plate 96 to be installed around cable 70 that is already engaged to a mole 40 and projects outwardly through the end 36 of a pipe 14. A plurality of frame engagement holes 439 are formed in the plate 96 to matingly engage the base plate alignment pins 406 of the cable pulling frame 84 for the aligned engagement of the frame 84 with the base plate 96. In the field it is not always possible to place the reaction plate 96 in a preferred, vertical maiiner as depicted in FIG. 8, and it may be necessary to place the reaction plate in a rotated manner. It would, however, still be desirable to place the mounting frame in a generally vertical orientation. To achieve this, additional sets of mounting holes 439A and 439B are advantageously formed in the reaction plate 96 to provide rotated mounting hole configurations into which the mounting pins 406 can be inserted to achieve a more nearly vertical mounting of the frame 84 with a rotated reaction plate 96.

It is to be understood that a significant feature of the frame member 84 is that a mole-attached cable 70 can be wrapped around the pulley 92, such that the interior portion 440 of the cable 70 projects between the legs 88 of the frame 84 and the outer end portion 444 of the cable 70 projects upwardly through the annulus 124 for engagement to a cable pulling device 120. Other and different frame construction configurations can readily be developed which provide the strength and stability of the frame member 84, and such alternative frame members are described hereinbelow.

Figure 9:
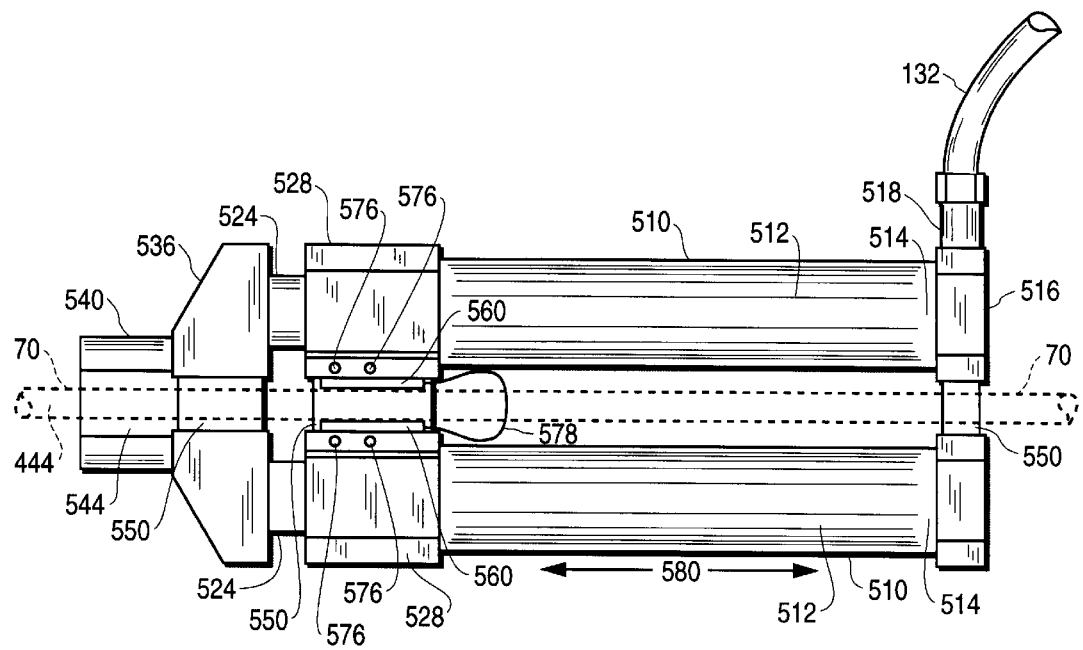
FIG. 9 is a side elevational view of a cable pulling device of the present invention.
Figure 10:
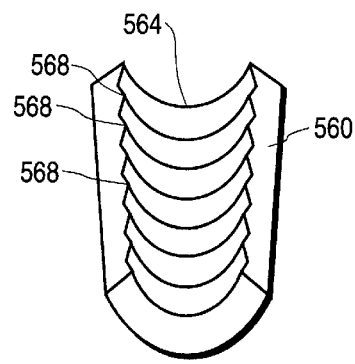
FIG. 10 is an enlarged view of the cable engaging collet of the cable puller depicted in FIG. 9.

A cable pulling device that is suitable for use in the present invention is depicted in a side elevational view in FIG. 9 and a cable engaging collet of the cable puller is depicted in FIG. 10. The cable puller 120 is preferably formed with two parallelly disposed hydraulic pistons 510 having outer piston housings 512 that are mounted at their rearward ends 514 to a rear end fixture 516. A forward end fixture 528 is engaged to the forward ends of the outer housings 512. The hydraulic lines 132 are engaged to the end fixtures 516 and 528 through a suitable coupling 518 such that hydraulic fluid passes through the hydraulic lines 132, through the end fixtures 516 and 528 and into the two hydraulic pistons 510. Hydraulic push rods 524 project outwardly from the forward end fixture 528 and are fixedly engaged to a front end block 536. A slotted, generally cylindrical nose piece 540 is engaged to the front end blcok 536. The nose piece 540 is formed with a cable passage slot 544 cut through a side of the nose piece 540, and the outer diameter of the nose piece 540 is sized to mount within the shoulder 434 of the slotted annulus 124 of the frame member 84, as is described hereinbelow with the aid of FIG. 11. A generally U-shaped cable passage slot, generally denoted by the numeral 550 is formed in each of the front end block 536, forward end fixture 528 and the rear end fixture 514, such that the cable 70 can be installed within the cable pulling device 120 from its side. That is, it is not necessary to thread an end of the cable 70 through the cable pulling device 120.

A plurality of cable pulling collets 560 are removably engaged within the cable passage slot 550 of the forward end fixture 528. As depicted in FIG. 10, each collet 560 is formed with a concave inner face 564 having a plurality of cable engaging ridges 568 cut into the inner surface thereof. The cable engaging ridges 568 are cut in a saw-tooth manner to create a one-way cable engagement surface. Collet retaining pins 576 are disposed in the front end fixture 528 to facilitate the replacement of collet members 560 when necessary. The gripping motion of the collets is enhanced by a collet biasing spring 578 that is engaged to the front end fixture and causes the collets to move in a synchronous manner to engage and disengage the cable 70. A preferred cable pulling device 120 utilizes two collets 560 disposed around the cable 70 to effectively engage the cable while permitting the easy side wise installation of the cable 70 within the collets 560. The cable puller 120 may be any of several such pulling devices, as have been built by any of several companies, and have been used for a number of years as post tensioning devices for post tensioning steel cable or rod, such as rebar, in concrete structures, and for tensioning bridge cable, in the bridge building industry. A device that is preferably used as the cable puller 120 is designed as a bridge cable tensioning device, used in the bridge construction industry, such as is manufactured and sold by the Chowder Machine Company of the State of Washington. Such post tensioning devices, also termed Post Tensioning Rams (PTR), have never before been used to pull a length of cable, for pulling or lifting objects this use has heretofore been assigned to winches, and/or block and tackle, and chain hoists. In the present invention the PTR is used for pulling the mole using varying lengths and size of cable from a few feet, to several thousand feet and the pulling force is not affected by cable length. Such PTR devices are light weight as compared to their pulling capability, generally pulling in excess of ½ ton per pound of weight, such that a 70 pound device 120 can place a 35 ton pulling force on the cable 70. The PTR in the present invention uses high pressure hydraulics (5,500 to 20,000 PSIG) to give the intense pulling power it delivers, and the PTR's light weight and portability, are the result of using high pressure hydraulics in small hydraulic cylinders. Typical prior art winches, etc., that produce such force levels can themselves weigh 2–5 tons. Thus a significant advantage of the present invention is the use of the light weight bridge cable tensioning device as a cable pulling device 120, which allows a single man to install and operate the present invention in the small hole 32.

It is therefore to be understood that when hydraulic pressure is applied to the two piston members 510, that the outer housing portions 512 of the pistons 510 will move laterally rearwardly 580 relative to the piston rods 524 and the front end block 536. It is also to be realized that when the nose piece 540 of the cable pulling device 120 is mounted in the annulus 124 of the frame 84, that the front end block 536 will remain stationary while the forward end fixture 528 and the two piston outer housings 512 will move rearwardly. Additionally, it is to be understood that the collet members 560 are disposed within the movable forward end fixture 528, and that when the collets 560 move rearwardly relative to the cable 70, that the saw-tooth ridges 568 of the collets 560 will grab the outer surface of the cable 70 and pull it rearwardly. Finally, after the piston housings 512 have traveled rearwardly to the extent of a piston stroke, the housings 512 will return to the forward position and, significantly, the collet ridges 568 will release their hold upon the cable and slide forwardly along the surface of the cable 70 Thus, with each repeatable, rearward cable pulling stroke of perhaps three to six inches, depending upon the piston travel 580 of the cable pulling device 120, the collet ridges 568 will pull the cable 70 rearwardly. Thereafter, upon the return stroke of the cable pulling device 120, the cable 70 will remain stationary while the collets 560 slide along its outer surface. Thus, each cable pulling stroke will pull the cable rearwardly, until, ultimately, the cable with its attached pipe parting mole will be pulled entirely through the pipe 14.

A detailed depiction of the mounting of the cable puller nose piece 540 within the annulus 124 is provided in FIG. 11. As depicted therein, the cable passage slot 430 is formed through the sidewall of the annulus 124 to permit the side wise mounting of a cable 70 into the cable passage bore 428. A shoulder 434 projects inwardly into the cable passage bore 428 to provide a stop on the inward insertion of the cable puller nose piece 540 within the cable passage bore 428, and the outer diameter of the nose piece 540 is sized to slidably fit within the cable passage bore 428 until the front surface 584 of the nose piece 540 rests against the shoulder 434.

As has been described hereinabove, the preferred method for installing the various components of the present invention upon a cable 70 is the side wise insertion of the cable 70 through the mounting slots 430 and 544 of the annulus 124 and nose piece 540 respectively. As depicted in FIG. 11, a preferred orientation of the annulus 124 and nose piece 540, following the insertion of the cable 70 within the cable mounting slots 430 and 544 respectively, is to rotate 588 the cable puller slot 544 through a 90 or more degree angle relative to the annulus slot 430. Thereafter, when the nose piece 540 is inserted within the annulus bore 428, the cable 70 will become locked into the mated structure. That is, if the two slots 544 and 430 are aligned, then the cable 70 can escape through the aligned slots, whereas the rotation 588 of the nose piece 540 relative to the annulus 124 creates a cable enclosing mated configuration. The inventors have found that the preferred, rotated mounting configuration maintains the cable 70 in proper alignment within the cable pulling collets 560, which improves the performance and reliability of the device.

Figure 13:
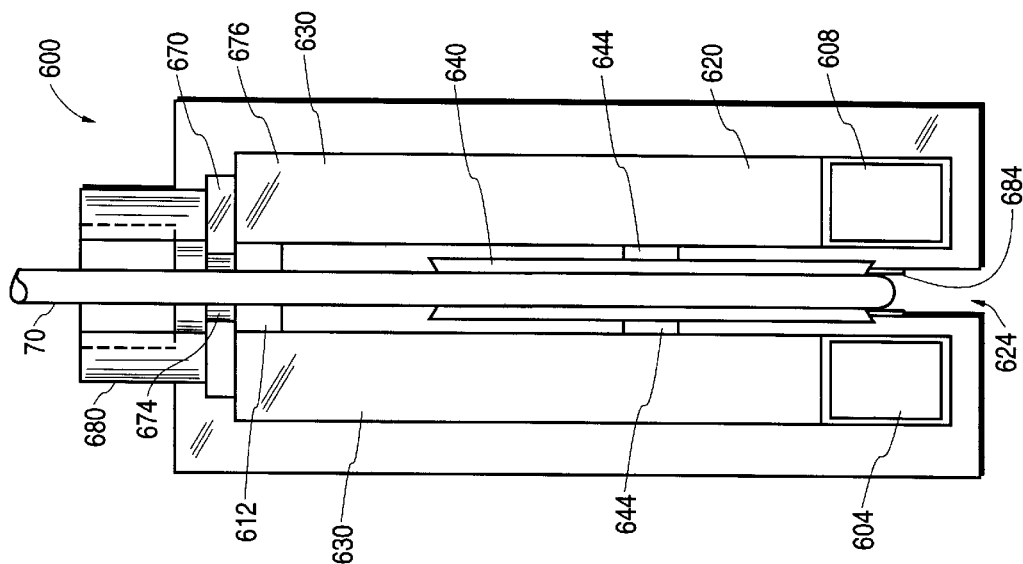
FIG. 13 is an end elevationai view of the mounting frame depicted in FIG. 12.
Figure 12:
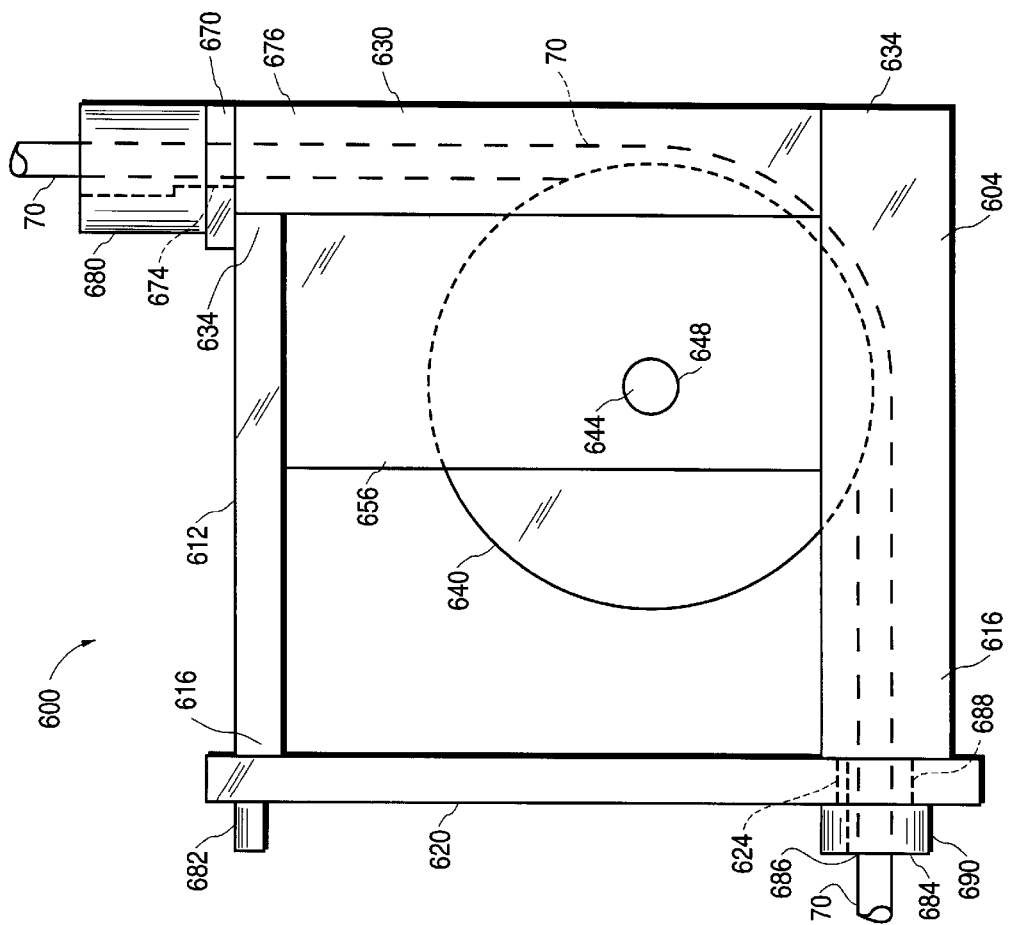
FIG. 12 is a side elevational view of a three-legged mounting frame of the present invention.

FIGS. 12 and 13 depict an alternative, three-legged cable pulling frame 600 of the present invention, wherein FIG. 12 is a side elevational view and FIG. 13 is an end elevational view. As depicted in FIGS. 12 and 13, the three-legged cable pulling frame 600 includes a first base leg 604, a second base leg 608 and a top leg 612, each of which is preferably formed from rectangular tubular steel stock. The front ends 616 of each of the legs 604, 608 and 612 are engaged, such as by welding to a front mounting plate 620, and a cable passage slot 624 is formed upwardly through the plate 620, such that a cable 70 is mountable therethrough. Further structural members 630 are utilized to engage the rearward ends 634 of the leg members 604, 608 and 612 together, such as by welding, to form a strong structure. A pulley 640 is rotatably mounted upon an axle 644 that is mounted within axle bores 648 formed through a pulley mounting plate 656 that is engaged, such as by welding, to the leg members 604, 608 and 612 and the frame members 630. It is to be realized that such a mounting plate 656 is disposed on each side of the pulley 640 to engage both ends of the axle 644. An annulus mounting plate 670 having a cable passage slot 674 formed therein is engaged, such as by welding, to the upper ends 676 of the frame members 530, and a slotted cylindrical annulus 680 is fixedly engaged, such as by bolting or welding to the annulus mounting plate 670. The annulus 680 is preferably similar in design to the annulus 124 described above. Thus the annulus slot and the mounting plate slot 674 are aligned to permit the sideways mounting of a cable 70 therewithin.

A single reaction plate mounting pin 682 is formed on the plate 620 to facilitate the mounting of the frame 600 with a mating bore (such as mounting pin bores 439) formed in a reaction plate, to which the frame 600 is removably engaged in a manner described hereinabove with regard to frame 84 and reaction plate 96. To further facilitate the engagement of the plate 620 with a reaction plate 96, a generally cylindrical cable guide member 684 is engaged within the slot 624. The guide member is also formed with a slotted cable passage bore 686 to permit the sideways insertion of the cable 70 therewithin. The guide member 684 is preferably formed with a smaller diameter portion 688 for mating insertion within the slot 624 of the plate 620, and a larger, outer diameter portion 690 for mating insertion within the cable mounting slot 104 of a reaction plate 96. In the preferred embodiment, the guide 684 is preferably formed from aluminum to provide a soft guide surface for interaction with the outer surface of the cable 70.

As compared with the four-legged cable pulling frame depicted in FIGS. 6 and 7, the three-legged frame of FIGS. 12 and 13 is generally lighter in weight and shorter in length. These features are generally advantageous because the lighter weight facilitates easier installation and manipulation by a user, and the shorter length facilitates the installation of the frame 600 in a smaller hole 32 than the longer legged frame 84. It is to be realized that the frame 600, like the frame 84, is mountable upon a pre-installed cable 70, such that the extending end of the cable 70 may be inserted within the cable mounting slots 684 and 624, wrapped around the pulley 640 and installed within the cable mounting slot 674 of the plate 670 and within the slotted annulus 680.

Figure 15:
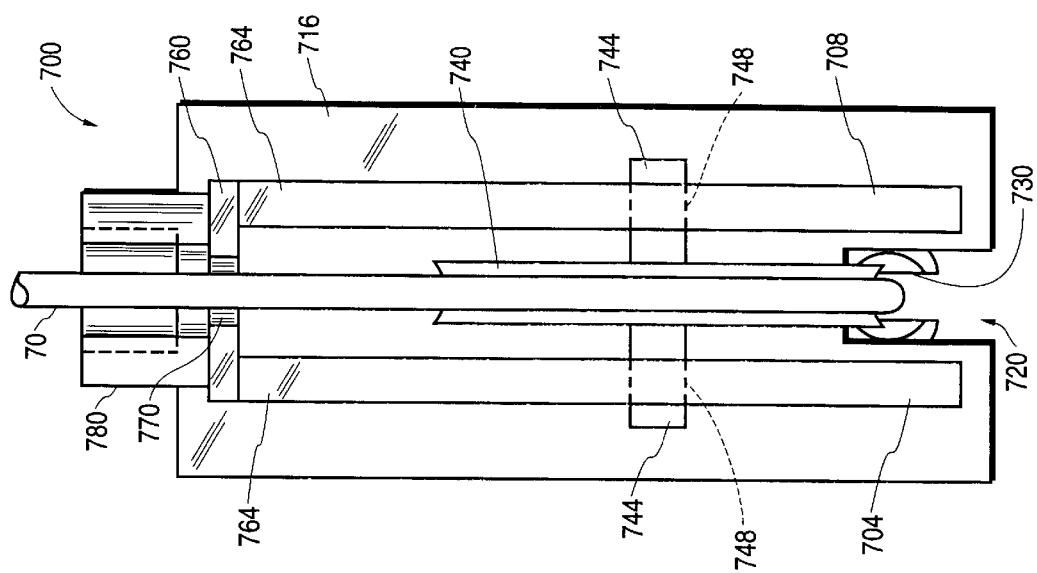
FIG. 15 is an end elevational view of the mounting frame depicted in FIG. 14.
Figure 14:
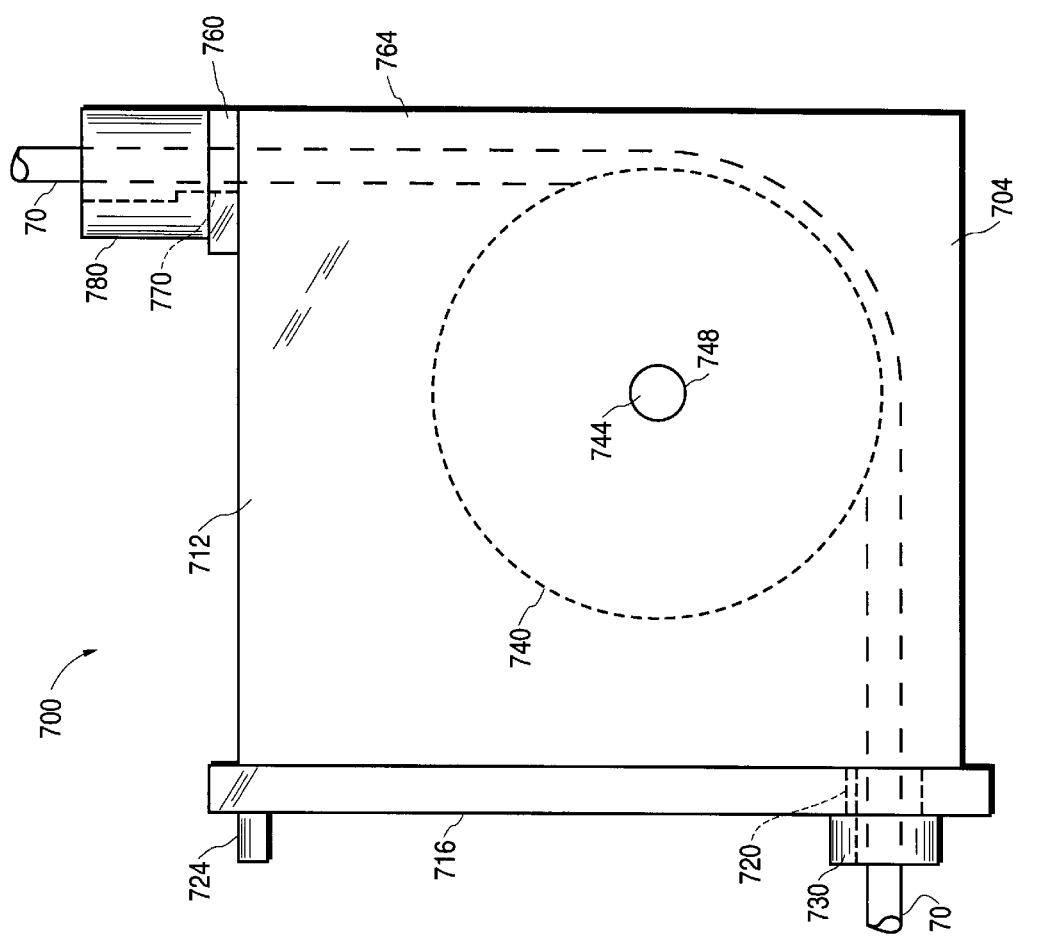
FIG. 14 is a side elevational view of another mounting frame embodiment of the present invention.

Still another cable pulling frame 700 of the present invention is depicted in FIGS. 14 and 15, therein FIG. 14 is a side elevational view and FIG. 15 is an end elevational view. As depicted in FIGS. 14 and 15, the frame 700 includes a left plate member 704 and a right plate member 708 that are fixedly engaged at a forward edge 712 to a front plate 716. The engagement may be by welding, threaded bolts or other conventional means. The front plate 716 is formed with an upwardly projecting cable insertion slot 720 and a reaction plate mounting pin 724, which is similar to mounting pin 682 of frame 600 and which mounts into a mating bore (such as bores 439) formed in a reaction plate. As with frame 600, a slotted guide member 730 may be engaged within the slot 720, which guide member 730 has an enlarged outer diameter portion 732 to slidably fit within a cable slot 104 formed in a reaction plate 96. A cable pulley 740 is rotatably mounted upon an axle 744 that projects through axle mounting holes 748 formed through the side plates 704 and 708. An annulus mounting plate 760 is fixedly engaged, such as by welding or threaded bolts to the top portions 764 of the side plates 704 and 708, and a cable mounting slot 770 is cut into the plate 760 for insertion of the cable 70 therethrough. A slotted annulus 780, similar in design to annulus 124, is mounted upon the plate 760, such as by welding or the utilization of threaded bolts, to provide for the mounting of a nose piece 540 of a cable pulling device 120 therewithin.

Frame 700 is generally easier to fabricate than frame 600, although its overall dimensions are quite similar. Frame 700 generally consists of fewer components than frame 600 and is easier to assemble, whether by welding or the use of threaded bolts It is to be understood that the frame 700, like frame 600 and frame 84, may be mounted upon a projecting end of an in-place cable 70, such that the cable 70 is mounted sideways into the cable insertion slots and wrapped around the pulley 740, as has been described in detail hereabove.

Figure 16:
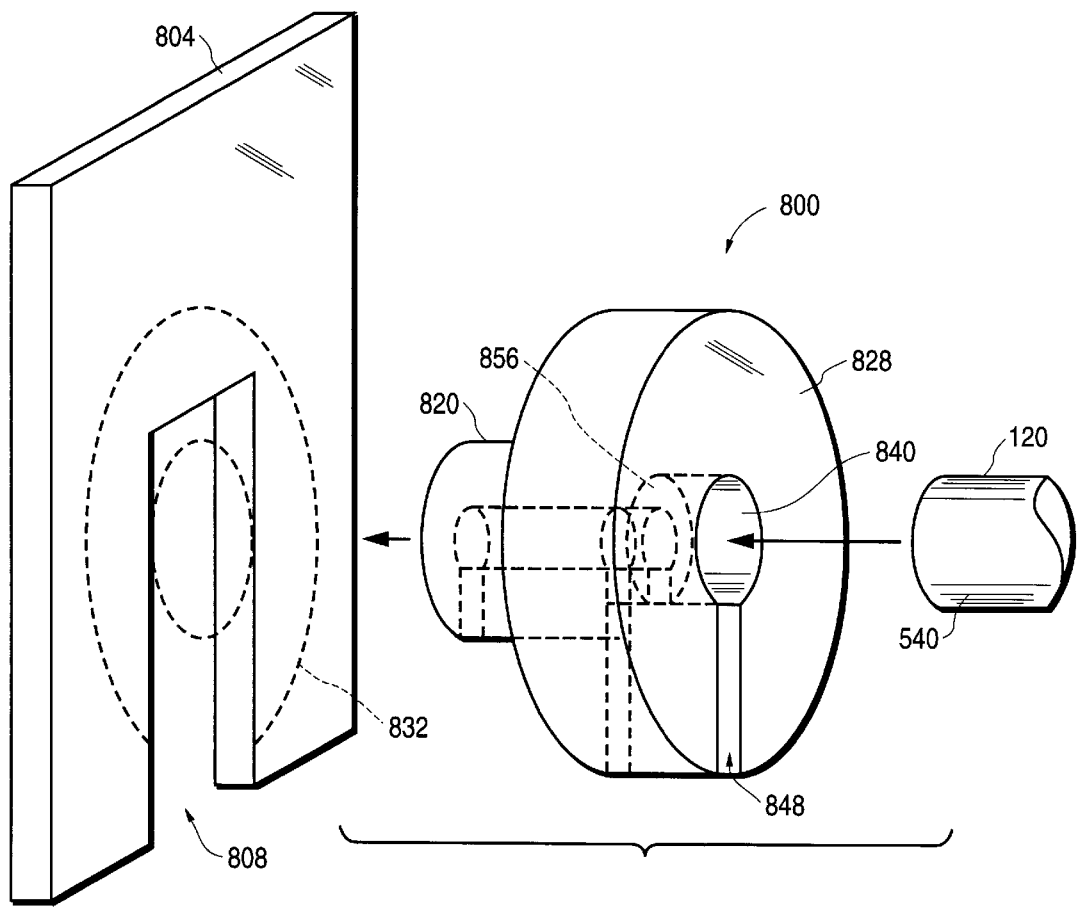
FIG. 16 is an exploded perspective view of a further cable pulling device mounting system of the present invention.

A further embodiment of the present invention is depicted in FIGS. 16, 17 and 18, in which FIG. 16 is an exploded perspective view, FIG. 17 is an end elevational view of an adapted annulus member 800 and FIG. 18 is a side elevational view of the annulus member 800 depicted in FIG. 17. As depicted in FIG. 16, a generally rectangular reaction plate 804 is formed with a cable insertion slot 808 therewithin. Generally cylindrical annulus member 800 is formed with an inner, generally cylindrical nose portion 820, having an outer diameter that is sized for insertion within the width of the slot 808. The annulus member 800 further includes an enlarged body portion 828 having a diameter that is significantly larger than the diameter of the nose portion 820, such that the enlarged portion 828 provides a large contact area 832 (shown in phantom upon the surface of the reaction plate 804) when the nose 820 of the annulus member 800 is inserted within the slot 808 of the reaction plate 804. A cable passage bore 840 is formed axially through the annulus member 800 and a cable mounting slot 848 is cut through the side of the member 800, such that the cable 70 may be sideways inserted into the cable bore 840. As with the annulus member 124, described hereinabove, the center bore 840 is formed with a diameter sized for the insertion of the nose piece 540 of a cable pulling device 120, and an inwardly projecting shoulder 856 is formed within the bore 840 to form a stop on the inward insertion of the nose piece 540 within the bore 840. It is therefore to be understood that the embodiment depicted in FIGS. 16, 17 and 18 facilitates the direct usage of the cable pulling device 120 in a horizontal orientation within an access hole 32, or within a pre-existing space, such as a large sewer main or a building basement, where it is not necessary to reorient the cable vertically out of a hole, such as hole 32 depicted in FIG. 1.

In some working environments, a backward pulling force such as cable stretch or plastic pipe stretch may exist upon the cable 70 such that the cable may be pulled backwardly into the pipe 14 between the pulling strokes of the cable pulling device 120. In such a situation, a retaining collet may be inserted within the bore 428 of the annulus 124. Such a retaining collet includes two or more collet members such as collet members 560, held within a slotted cylindrical member, and which collets have reverse sawtooth ridges that grip the cable upon its movement backwards within the annulus.

Upon consideration of the various preferred embodiments described in detail hereinabove, it is to be understood that a generalized description of the present invention includes a mole, a cable attachable to the mole for pulling it through a pipe, a cable pulling device that is engagable to the cable and a cable pulling device engagement means which functions to provide a reactive support for the cable pulling device. In various embodiments, the cable pulling device engagement means includes the reaction plate and an annulus type member for holding the cable pulling device and may further include the various mounting frames and their components depicted and described herein. Significant features of the mole of the present invention include a plurality of pipe scoring wheels wherein two such wheels may be located on one side of the mole for enhanced pipe scoring, and wherein pipe scoring wheels can be located at 180° opposite surfaces of the mole for enhanced pipe scoring and parting of the pipe along the opposing scored lines. The preferred cable pulling device of the present invention is a hydraulic bridge cable tensioning device that operates in a cyclic cable pulling manner, having repeatable short pulling strokes. The cable is sideways mountable within the cable pulling device for ease of mounting and assembly. The cable pulling frames components and annulus are formed with cable mounting slots, such that these components may also be sideways mounted upon the cable for ease of assembly of the device.

Figure 19:
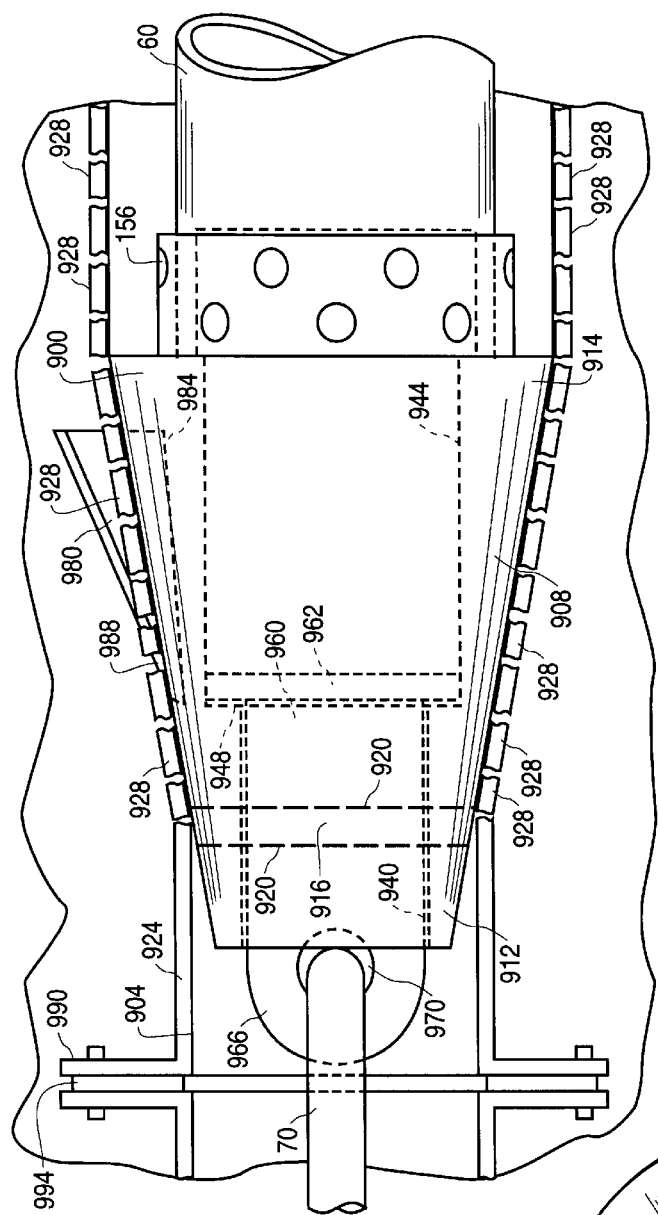
FIG. 19 is a side elevational view of an alternative mole embodiment of the present invention.
Figure 20:
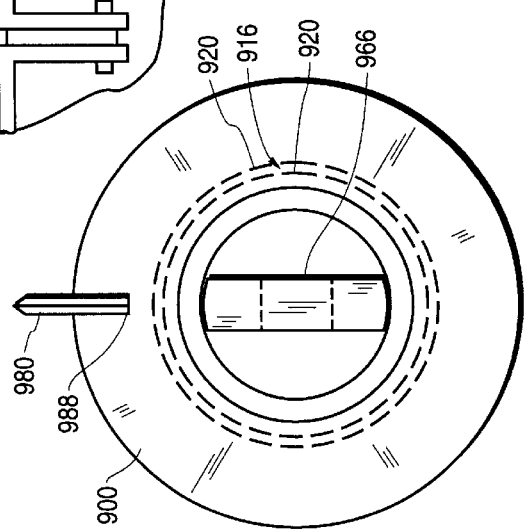
FIG. 20 is an end elevational view of the mole depicted in FIG. 19.
Figure 21:
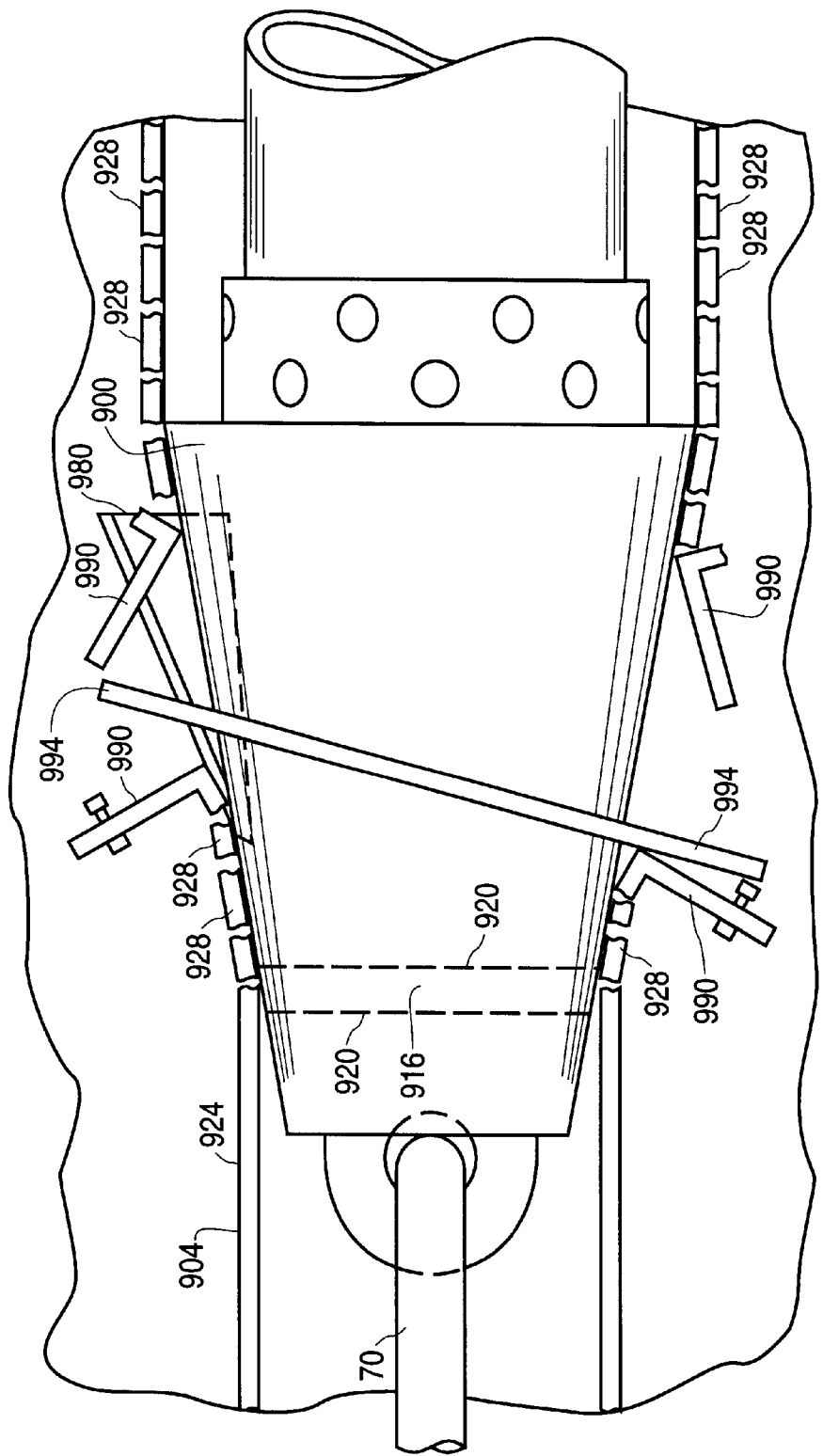
FIG. 21 is a side elevational view of the mole depicted in FIG. 19 where the blade is engaged with a seal.

A further mole design 900 is depicted in FIGS. 19, 20 and 21, wherein FIG. 19 is a side elevational view of the mole 900 depicted in a pipe bursting operation; FIG. 20 is a front elevational view of the mole 900 and FIG. 21 is a side elevational view of the mole 900 depicted in a further stage of a pipe bursting operation. As depicted in FIG. 19, the mole 900 is being pulled through a pipe 904 composed of fracturable material, such as cast iron or ceramic pipe. A pulling cable 70 is engaged to the mole 900 as has generally been described hereinabove. The mole 900 includes a tapered body portion 908 having a front end 912 whose diameter is less than the diameter of the pipe 904 and a rearward end 914 whose diameter is greater than the diameter of the pipe 904. The tapered body 908 of the mole engages the pipe at a pipe engagement region 916 generally existing between the dotted pipe engagement lines 920 and fractured pipe segments 928 exist behind the pipe engagement lines 920. It is therefore to be understood that a generalized outward force that is uniformly, circumferentially applied to the pipe 904 in the engagement region 916 causes the pipe material to fracture due to the large pulling force applied to the mole 900 through the cable 70. Therefore, in the mole embodiment 900 a smooth tapered surface mole is utilized to burst the fracturable pipe 904.

As depicted in FIG. 19, a cylindrical bore is formed axially through the mole 900. The bore includes a forward portion 940 having a first diameter and a rearward portion 944 having a larger diameter, such that a shoulder 948 is formed in the inner surface of the central bore. A cable engaging member 960 having a round base portion 962 and a forwardly projecting cable engagement tongue 966 is insertable into the mole 900 from the rearward end of the bore 944, The diameter of the round portion 962 is sufficiently large to engage the shoulder 948 and a cable engagement hole 970 is formed in the outer portion of the tongue 966 such that the cable may be engaged thereto. As has been discussed hereinabove, replacement pipe 60 is engaged to the rearward end of the mole 900, such as through the use of a retaining sleeve 156 as described hereinabove.

A single blade 980 may be engaged within a blade holding slot 984 to project from the side of the tapered body portion 908. Significantly, the frontward edge 988 of the blade 980 is disposed rearwardly of the pipe fracturing region 916, such that the blade 980 is not utilized in the pipe fracturing activity of the mole 900. The blade 980 is utilized where the mole 900 encounters pipe engagement fixtures such as the pipe flanges 990 which include a flexible seal 994. Specifically, as depicted in FIG. 21 and in comparison to FIG. 19, the mole 900 has been pulled (leftward) through the pipe 904 past the flange members 990, such that the pipe around the flange members has been fractured. Nevertheless, the flexible seal member 994 has remained intact. In testing with smooth tapered surface moles, the inventors have found that such moles work very well in fracturing pipe, however seals such as 994 sometimes create significant drag. Blade 980 thus augments the mole 900 by providing a sharp edge which will cut through the seal 994, whereby it will pass around the mole and not create a drag problem. It is therefore the case that a smooth tapered mole, without any fins is quite adequate to fracture and replace fracturable pipe such as cast iron and ceramic. Where certain types of pipe joinder fixtures are encountered, a blade 980 may be required to efficiently remove portions of the pipe engagement fixture from around the mole.

Figure 22:
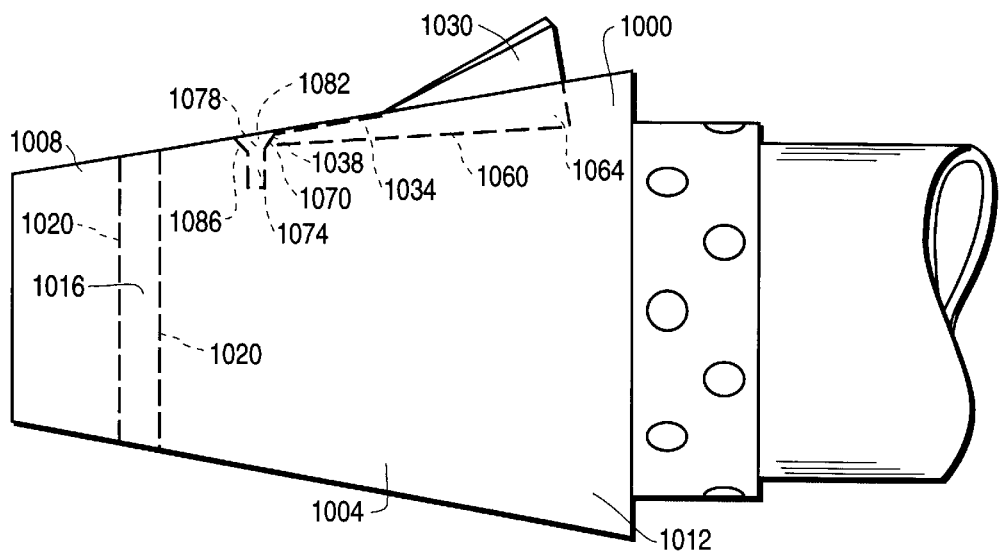
FIG. 22 is a side elevational view of yet another mole design of the present invention.
Figure 23:
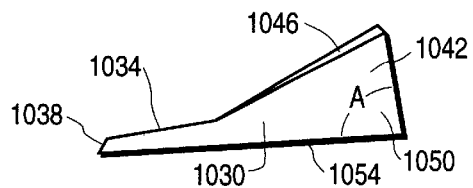
FIG. 23 is a side elevational view of the mole blade depicted in FIG. 22.

Still further alternative mole designs are depicted in FIGS. 22 and 23, wherein FIG. 22 is a side elevational view depicting an alternative fin design with a mole, and FIG. 23 is a side elevational view of the fin depicted in FIG. 22. As depicted in FIG. 22, a mole 1000 is formed with a tapered body portion 1004 having a front end 1008 whose diameter is less than the diameter pipe (not shown) through which the mole will be pulled, and a rearward end 1012 having a diameter that is larger than the diameter of pipe. The mole 1000 is therefore substantially similar to the mole 900 depicted in FIGS. 19, 20 and 21. Specifically, a pipe engagement region 1016 is generally defined as lying between two dotted pipe engagement lines 1020. The significant, novel features of the mole 1000 are found in the shape of a flange seal splitting fin and the method of engagement of the fin to the mole body 1004.

As can be seen with the help of FIG. 23, the fin 1030 is formed with a relatively narrow frontward portion 1034 that has a beveled frontward tip 1038. The rearward portion 1042 of the fin projects outwardly and includes a cutting edge 1046 to engage and cut flange seals, as described hereinabove with regard to mole 900 and depicted in FIG. 21. The rearward edge 1050 of the fin projects downwardly to form an angle A of approximately 80° with the base 1054 of the fin.

Returning to FIG. 22, the fin 1030 resides in a fin engagement slot 1060 formed in the surface of the mole body 1004 such that the narrow frontward portion 1034 of the fin resides completely within the slot 1060. The rearward portion 1064 of the slot 1060 is formed with corresponding approximately 80° angle, such that the rearward portion of the fin (defined by anfle A) is matingly engaged therein. The frontward end 1070 of the slot 1060 includes a threaded bore 1074 for receiving a threaded screw 1078 having a tapered head 1082. The frontward edge 1086 of the slot is tapered to receive the head 1082 of the screw 1078 therewithin, and the tapered frontward tip 1038 of the fin 1030 resides in the slot 1060 such that the frontward tip 1038 is held in place by the head 1082 of the screw 1078 and the rearward edge 1050 of the fin 1030 is held in place by the rearward end 1064 of the slot 1060 that has an angle A of approximately 80°. It will therefore be appreciated by those skilled in the art that the fin 1030 can easily be removed entirely for general pipe fracturing operations, and that the fin 1030 can be easily inserted should the need arise.

Figure 24:
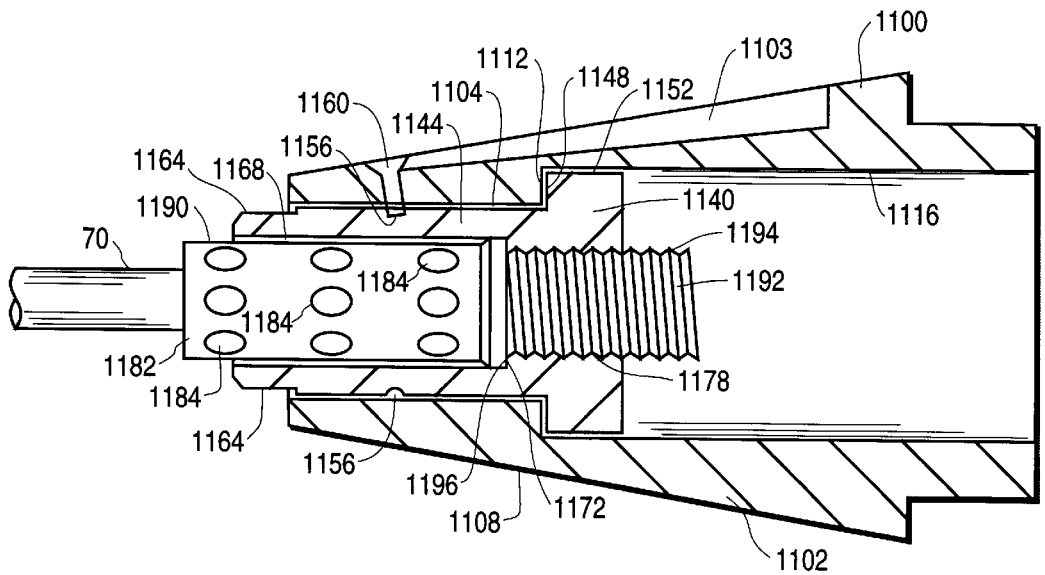
FIG. 24 is a side cross-sectional view of a mole, depicting a cable engagement fixture of the present invention.

FIG. 24 depicts and alternative method for the engagement of a pulling cable 70 with a mole 1100. As depicted therein, the mole 1100 is formed with a smooth tapered pipe engagement surface 1102 having a blade slot 1103 formed therein. A smooth cylindrical bore 1104 is formed axially into the nose portion 1108 of the mole 1100, and an outwardly projecting shoulder 1112 connects the bore 1104 with a larger interior bore 1116.

A generally cylindrical mole engagement nut 1140 resides within the bores 1104 and 1116 of the mole. The nut 1140 includes a cylindrical outer portion 1144 that resides within bore 1104, an outwardly projecting shoulder 1148 that matingly engages shoulder 1112 of the mole, and an enlarged cylindrical portion 1152 that resides within the mole bore 1116 It is therefore to be understood that the nut 1140 is insertable into the mole through bore 1116 until the nut shoulder 1148 engages the mole shoulder 1112. A circumferential groove 1156 is formed in the outer surface of the cylindrical portion 1144 and a threaded screw 1160 is insertable in a threaded bore formed in the mole surface 1102 to hold the nut 1140 within the mole during the cable attachment process. The nut further includes a projecting hex nut end portion 1164 that is formed with flat hex nut surfaces, such that a wrench can be applied thereto to rotate the engagement nut 1140. The engagement nut 1140 further includes a cylindrical bore 1168 that is formed axially into the nut 1104. The bore 1168 terminates at an inwardly projecting shoulder 1172 which joins an inner threaded bore 1178.

A cable end fixture 1182 is engaged to the end of the pulling cable 70 by impact swaging 1184 an outer sleeve 1190 of the fixture 1182 onto the cable 70. The end 1192 of the fixture 1182 is formed with threads 1194 that threadably engage the threaded bore 1178 of the mole engagement nut 1140. The fixture 1182 is further formed with a radially projecting shoulder 1196 that engages the bore shoulder 1172 when the fixture 1182 is fully threadably engaged with the nut 1140.

It is therefore to be understood that the nut 1140 is first inserted into the mole bore 1116 and the screw 1160 is tightened such that it projects into the groove 1156 to hold the nut within the mole 1100. Significantly, the nut 1140 is rotatable within the mole bore 1116. Thereafter, the threaded cable end fixture 1182 is inserted into the bore 1168 and a wrench is then operatively engaged with the hex nut end portion 1164 of the nut 1140. The engagement nut 1140 is thereby rotated until the fixture 1182 is fully threadably engaged with the nut 1140. Thereafter, the pulling force upon the cable 70 will pull the nut 1140 and the engagement of the shoulders 1148 and 1112 will cause the mole to be pulled with the cable. The mole and cable are rotatable with respect to each other.

Figure 25:
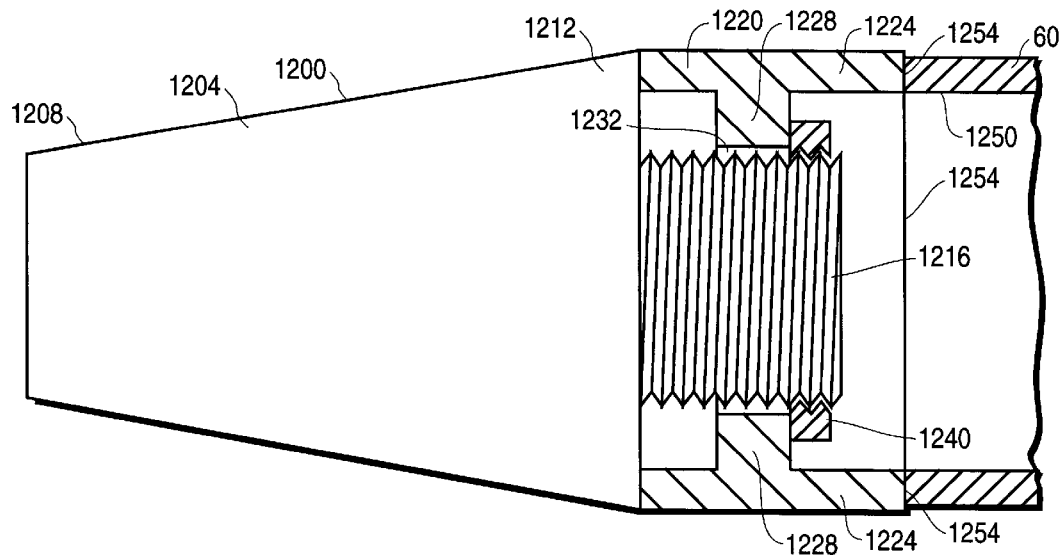
FIG. 25 is a side cross-sectional view of a replacement pipe engagement system of the present invention.
Figure 26:
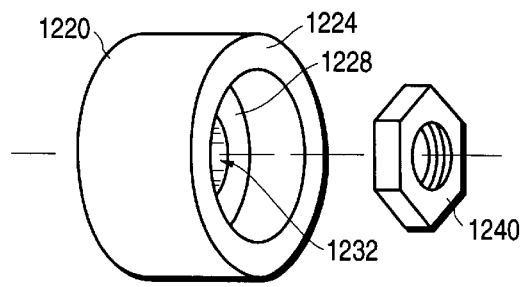
FIG. 26 is a perspective view of a replacement pipe engagement sleeve utilized in the replacement pipe engagement method depicted in FIG. 25.

An alternative method for the attachment pipe to the rearward end of a mole is depicted in FIGS. 25 and and 26, wherein FIG. 25 is a side elevational view of the replacement pipe attachment and FIG. 26 is perspective view of the replacement pipe attachment sleeve. As depicted in FIGS. 25 and 26 a mole 1200 has a tapered smooth body 1204 having a relatively narrow frontward end 1208 and a relatively wide rearward end 1212. A threaded, cylindrical sleeve engagement member 1216 is integrally formed with the mole body 1204 and projects rearwardly therefrom. As indicated hereinabove, such a simple mole performs quite adequately for fracturable pipe such as cast iron and ceramic materials. In fact, such a smooth mole will even split steel pipe due to the large pulling forces applied to it.

A replacement pipe engagement sleeve 1220 comprises a generally cylindrical member having cylindrical sidewalls 1224 that are at least as thick as the sidewalls of the replacement pipe 60. The sleeve 1220 further includes a radially, inwardly projecting wall portion 1228 having a bore 1232 formed therethrough, such that the threaded sleeve engagement member 1216 projects through the bore 1232 when the sleeve 1220 is mounted to the rearward end 1212 of the mole 1200. A large threaded nut 1240 is threadably engaged upon the threads of the sleeve engagement member 1216 to frictionally engage the inwardly projecting wall 1228, such that the threadable tightening of the nut 1240 will cause the sleeve 1220 to be engaged to the mole 1200. The end 1250 of the replacement pipe 60 is thermofusion bonded 1254 to the wall 1224 of the sleeve 1220 after the nut 1240 has been threadably tightened to engage the sleeve to the mole. It is therefore to be understood that the replacement pipe 60 is engaged to the sleeve 1200 utilizing a thermofusion bond 1254 and the sleeve 1200 is threadably engaged to the mole 1200.

Figure 27:
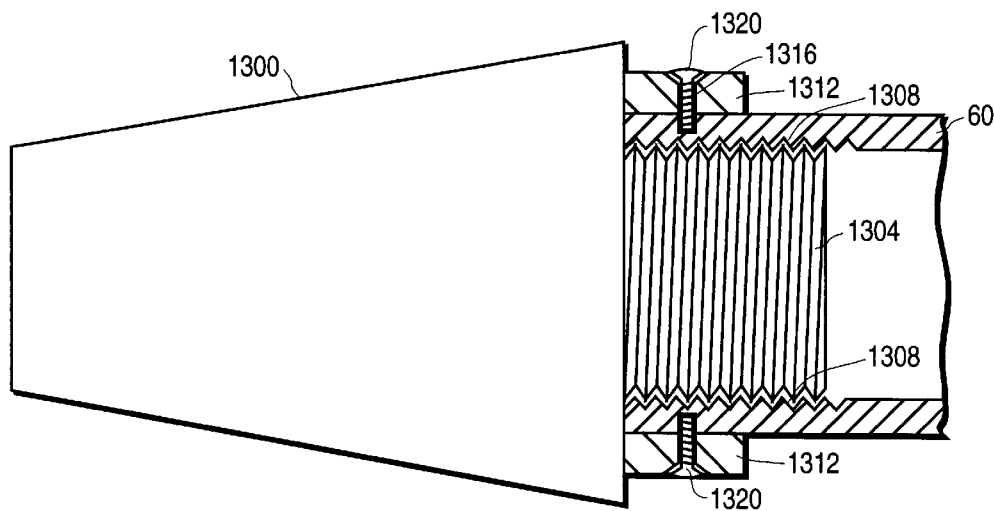
FIG. 27 is a side cross-sectional view depicting another replacement pipe engagement system of the present invention.

FIG. 27 is a side elevational view depicting still another method for the engagement of the replacement pipe to a mole. As depicted therein a mole 1300, which is similar to mole 1100 and 1200, is formed with a rearwardly projecting threaded pipe engagement member 1304. The replacement pipe 60 is formed with internal threads 1308 that threadably engage the threads on the member 1304, whereby the replacement pipe 60 is engaged to the mole 1300. A cylindrical sleeve 1312, preferably formed of steel or a similar hard metal is disposed externally of the threads 1308 at the end of the replacement pipe 60 to prevent the pipe 60 from separating from the mole 1300. A plurality of threaded screw holes 1316 are formed through the sleeve 1312 and threaded bolts 1320 are inserted therewithin to further hold the sleeve 1312 and pipe 60 together in engagement with the threaded sleeve engagement member 1304.

Figure 28:
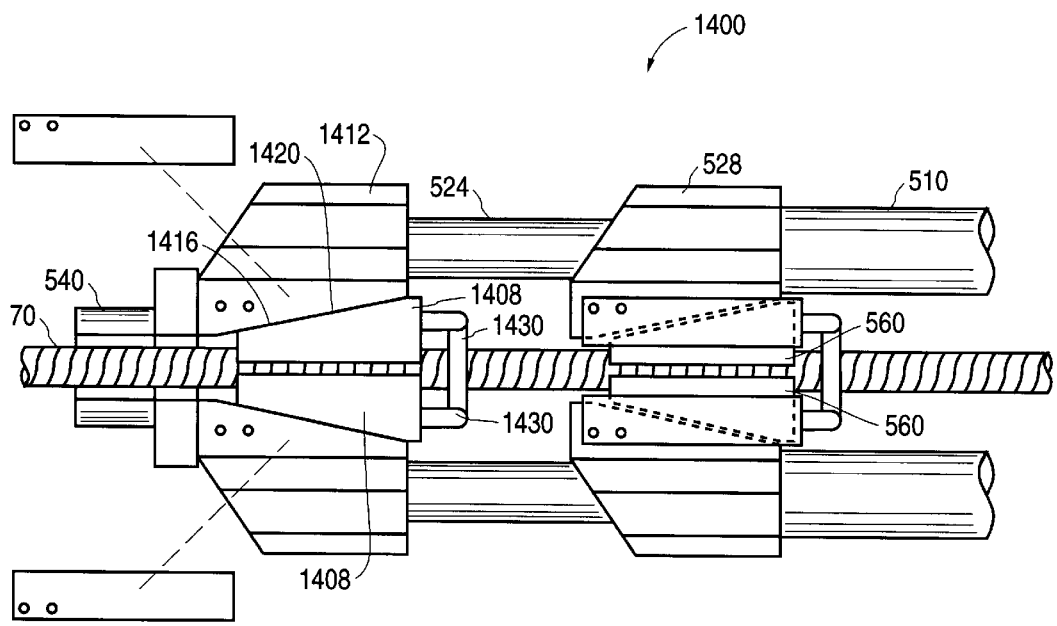
FIG. 28 is a side elevational view of a cable pulling device of the present invention having two sets of collets.
Figure 29:
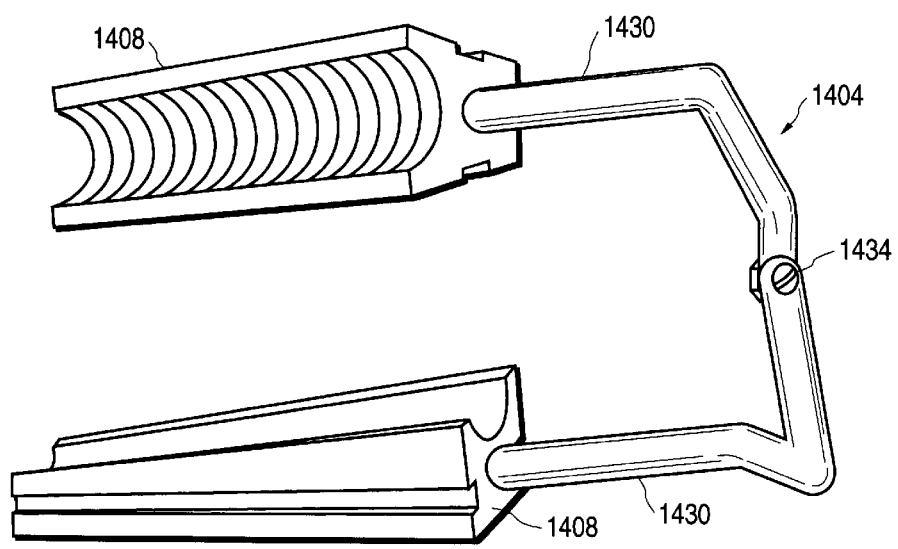
FIG. 29 is a perspective view of a set of collets utilized in the cable pulling device depicted in FIG. 28.

An improved PTR cable pulling device 1400 is depicted in FIG. 28 and cable pulling collets 1404 for the device 1400 are depicted in FIG. 29. Comparing the cable pulling device 120 depicted in FIG. 9 with the cable pulling device 1400 depicted in FIG. 28, it will be seen that the significant difference between the two cable pulling devices 120 and 1400 is that a second pair of collets 1408 is disposed in the front end block 1412 of the cable pulling device 1400 as compared to the front end block 536 of the PTR cable pulling device 120. To accommodate the collets 1408, the front end block 1412 is larger than the front end block 536 of cable puller 120.

As was previously described with regard to cable puller 120, and with reference to FIG. 28, when the hydraulic pistons 510 are activated the forward end fixture 528 moves away from the front end block 1412. The rearward motion of the forward end fixture 528 causes the collects 560 to close upon and grab the cable 70, pulling it rearwardly (to the right in FIG. 28). Significantly, the front collects 1408 do not grab the cable 70 during the rearward motion caused by the movement of the fixture 528. After the fixture 528 has completed its stroke of generally two to six inches, the forward end fixture 528 returns to its starting position and, the collects 560 release their hold upon the cable and slide forwardly along the surface of the cable. As has been indicated hereabove, where significant resistive force exists in the cable, the cable may stretch, whereupon the cable will not remain stationary, but rather it returns to its unstretched condition. It has been experienced that a long cable may actually stretch one to three inches, thereby significantly reducing the cable motion gain of each stroke of the cable puller.

Figure 30:
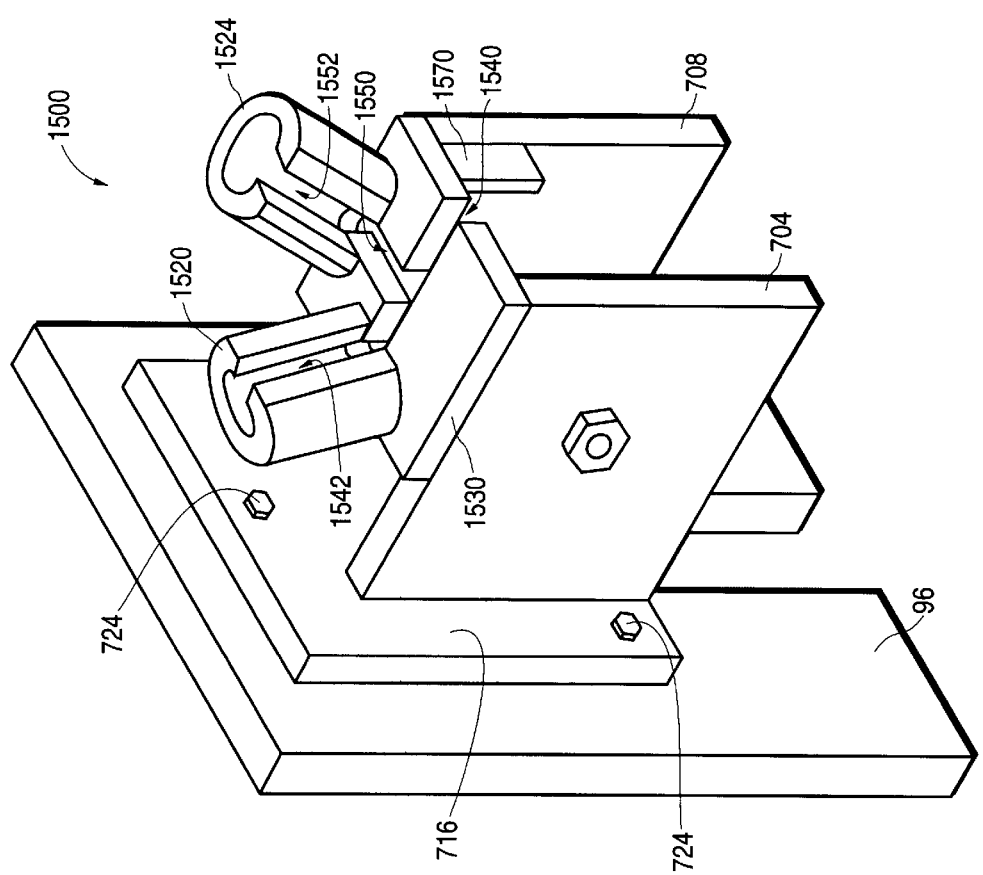
FIG. 30 is a perspective view of yet another cable pulling frame, being adapted for the engagement of two cable pulling devices and two pulling cables.
Figure 31:
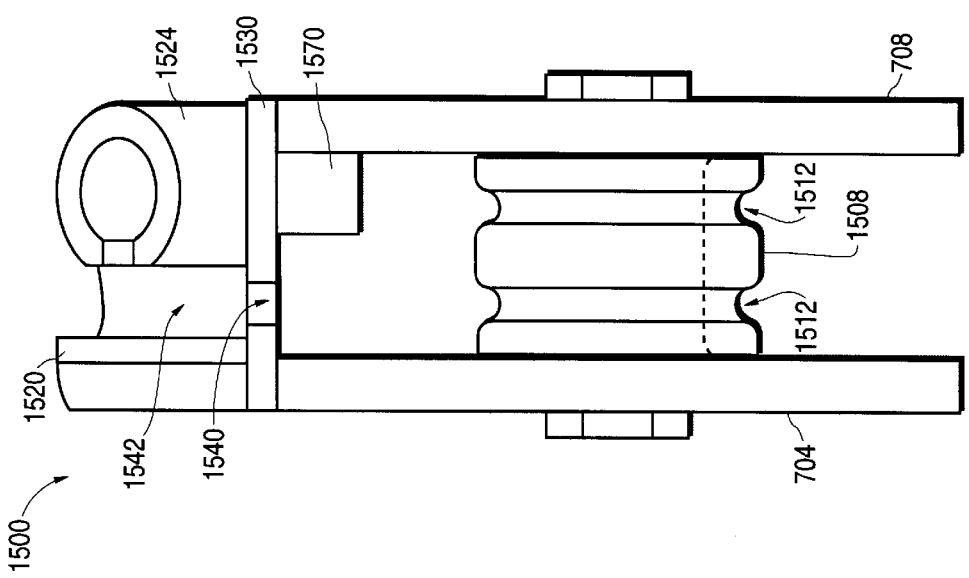
FIG. 31 is an end elevational view of the device depicted in FIG. 30.
Figure 32:
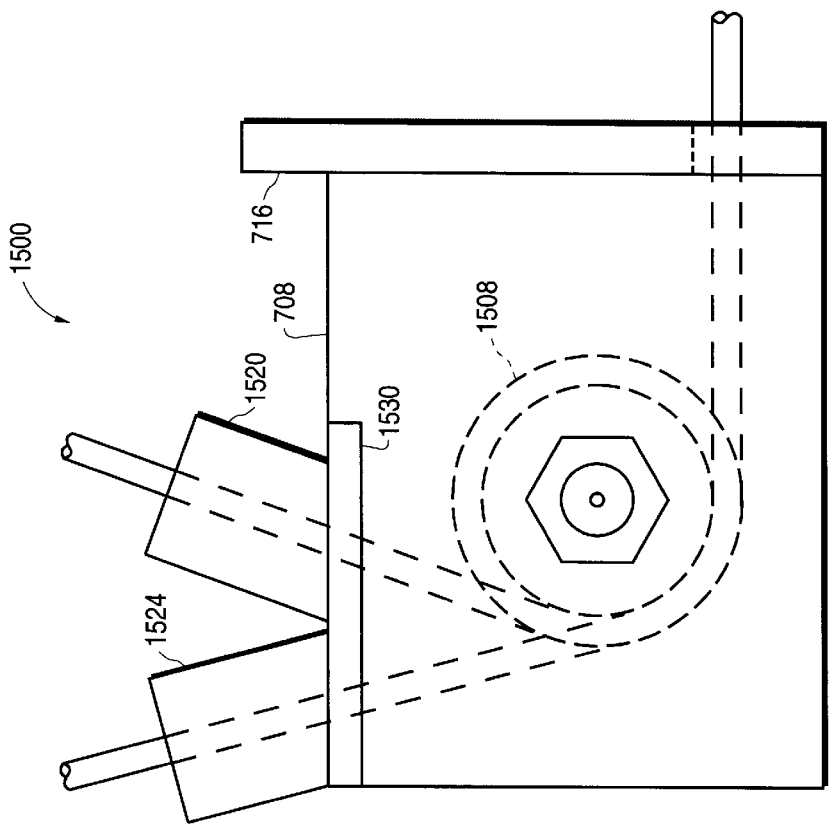
FIG. 32 is a side elevational view of the device depicted in FIG. 30.
Figure 33:
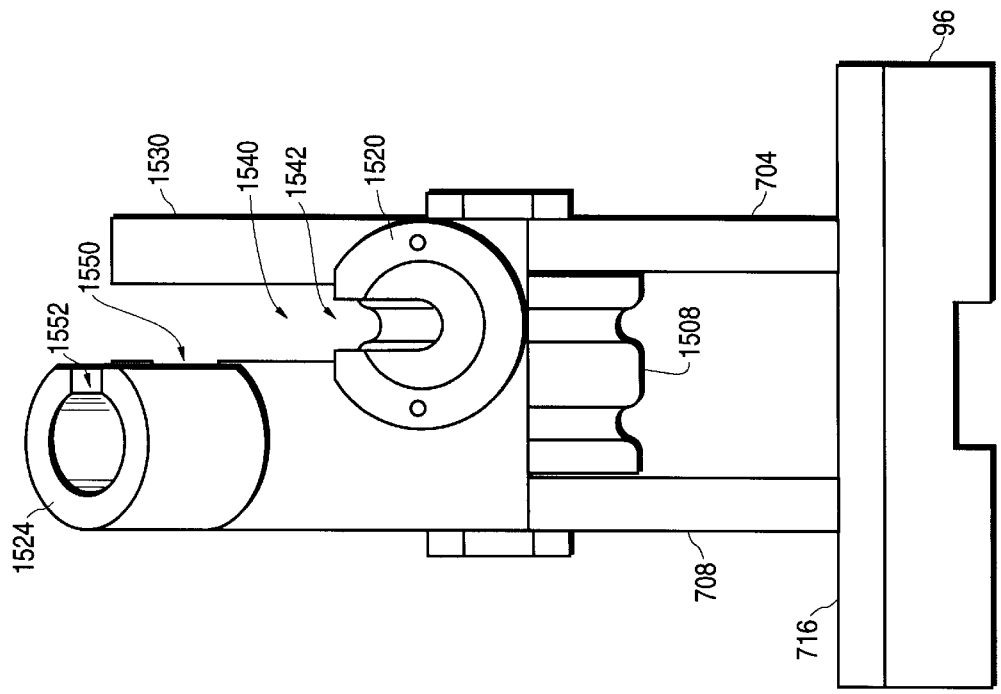
FIG. 33 is a top plan view of the device depicted in FIG. 30.

The front collets 1408 are thus provided to prevent the cable from returning to its unstretched position. Specifically, after a cable pulling stroke, and assuming that there is some cable stretching within the cable, upon release of the rearward collets 560, the cable will tend to move towards its unstretched position which would be leftward in FIG. 28. At this point the forward collets 1408 engage the cable and, due to the tapered surfaces 1416 of the collets 1408 and the collets engagement surfaces 1420 of the block 1412, the collets 1408 engage the cable and prevent its leftward motion, thereby retaining the tension in the cable. The frontward collets 1408 thereby prevent leftward cable motion and increase the efficiency of the cable pulling device by insuring that each cable pulling stroke will pull the cable a full stroke length, without significant cable return motion upon cable release by the pulling collets 560. While various collet designs are suitable, as depicted in FIG. 29, the preferred collet design includes two cable engagement members 1408 that are rotatable about a collet engagement rod 1430, and which are pivotable about a rod engagement screw 1434. It is therefore to be understood that the improved PTR cable pulling device 1400 provides for cyclic pulling of the cable 70 while it prevents any cable return motion between pulling strokes due to the use of the forward cable engaging collets 1408.

Where large pulling forces are required it may be necessary to attach two cables to a single mole and utilize two cable pulling devices, such that each cable pulling device is operating on one of the two cables. To effectively accomplish this, a pulling frame that accommodates two cables and two pulling devices is required. Such a pulling frame is depicted in FIGS. 30, 31, 32 and 33, wherein FIG. 30 is a perspective view, FIG. 31 is an end elevational view, FIG. 32 is a side elevational view and FIG. 33 is a top plan view. As depicted in FIGS. 30–33, the dual cable frame 1500 is similar in many respects to the cable pulling frame 700 depicted in FIGS. 14 and 15. Specifically, the frame 1500 is mountable upon a reaction plate 96. It includes a left plate member 704 and a right plate member 708 that are engaged to a front plate member 716 that is mountable to the reaction plate 96 utilizing mounting pins 724. A pulley 1508 having two cable grooves 1512 is mounted between the left and right plate members. Two slotted annuluses 1520 and 1524 are mounted upon a mounting plate 1530. Mounting plate 1530 is formed with a cable passage slot 1540 that is aligned with the cable passage slot 1542 formed in the annulus 1520, such that a cable can be sideways mounted therethrough. Similarly, mounting plate 1530 is formed with a cable mounting slot 1550, which intersects slot 1540 and which is aligned with the cable mounting slot 1552 of the annulus 1524, such that a cable can be sideways mounted therewithin. Due to the existence of mounting slot 1540, the mounting plate 1530 is not structurally well supported on both sides. Therefore, an additional structural support member 1570 is engaged to plate member 708 beneath the mounting plate 1530 to provide additional structural support to the mounting plate. As is best seen in FIGS. 30 and 32, the two annulus members 1520 and 1524 are mounted at an angle with respect to each other. This angular mounting is necessary in order to provide operational space for the two cable pulling members that will be mounted into the annulus members 1520 and 1524. In order to accomplish the angled mounting, the base portions of the two annulus members are cut at an angle to the central axis thereof. It is therefore to be understood that the dual cable mounting frame 1500 provides for the simultaneous mounting and usage of two cable pulling devices, each pulling a separate cable that is mounted to a single mole. The dual cable pulling frame thereby permits the user to apply the pulling force of two cable pulling devices to a single mole to pull it through even the most difficult pipe environments.

The significant advantages of the present invention are its relatively small, light weight components which allow a single operator to transport, install and operate the device for trenchless replacement of underground pipe. The larger pulling force generated by the PTR cable pulling device allows it to pull the mole through pipe of varying diameters and composed of virtually any pipe material, whether it be fracturable (such as cast iron or ceramic) or malleable (such as steel). The relatively low cost of the components permit individual contractors and small companies to effectively compete in a marketplace that heretofore has been reserved for large companies having the manpower and resources to purchase and transport the relatively large and expensive components that heretofore have been necessary to conduct the trenchless replacement of underground pipe.

While the present invention has been shown and described with regard to its preferred embodiments, it will be understood by those skilled in the art that alterations and modifications in form and detail may be made therein without departing from the true spirit and scope of the invention. It is therefore intended that the following claims cover all such alterations and modifications that encompass the true spirit and scope of the invention.

What we claim is:

1. A device for the trenchless replacement of in-situ pipe, comprising:
    a mole;
    a length of cable, said cable being engagable to said mole;
    a cable pulling device being releasably engagable to said cable;
    a cable pulling device mounting frame being releasably engagable to said cable pulling device; and
    wherein said cable pulling device includes at least one pair of cable engaging collets that function to engage said cable on a said pulling stroke and to release said cable on a said recovery stroke; and wherein at least one further pair of collets is provided that function to engage said cable on said recovery stroke and release said cable on said pulling stroke.

2. A device as described in claim 1 said further air of collets is engaged within said cable pulling device.

3. A device as described in claim 2 wherein said cable pulling device is formed with a slotted cable insertion means for the sideways insertion of said cable within said cable pulling device.

4. A device as described in claim 1 wherein said cable pulling device is a post tensioning ram (PTR), and wherein the weight to pulling force ratio of the PTR is in the range of 2 pounds of weight per ton (2,000 pounds) of pulling force.

5. A device as in claim 4 wherein the PTR provides a pulling power through the use of hydraulic pressure in the range of 5,500 to 20,000 PSIG.

6. A device for the trenchless replacement of in-situ pipe, comprising:
   a mole;
   a length of cable, said cable being engagable to said mole;
   a cable pulling device being releasably engagable to said cable;
   a cable pulling device mounting frame being releasably engagable to said cable pulling device;
   wherein said mole includes a nose portion being engagable to said cable, a tapered body portion and a replacement pipe engagement portion, said mole further including at least one blade, said tapered body portion acting to initially contact, fracture and expand said pipe for the replacement thereof with a length of replacement pipe, and said blade acting to cut pipe engagement devices encountered by said mole after said pipe has been expanded by said tapered body portion.

7. A device for the trenchless replacement of in-situ pipe, comprising:
   a mole;
   a length of cable, said cable being engagable to said mole;
   a cable pulling device;
   a cable pulling device mounting frame being releasably engagable to said cable pulling device
   wherein said cable pulling device mounting frame includes an annulus member including a cable passage bore formed therethrough and a cable insertion slot formed through portions of said annulus member for the sideways insertion of said cable within said cable passage bore of said annulus member and
   wherein said annulus member includes a cable pulling device engagement portion for releasably engaging a portion of said cable pulling device.

8. A device as described in claim 7 wherein said cable pulling device mounting frame includes a reaction plate having an enlarged surface for disbursing a reaction force against a cable pulling force generated by said cable pulling device.

9. A device as described in claim 8 wherein said annulus member is mountable in relation to said reaction plate such that said reaction plate disburses cable pulling forces exerted on said annulus by said cable pulling device.

10. A device as described in claim 9 wherein said cable pulling device includes a mounting nose piece, and said annulus member includes a bore that is disposed to receive said nose piece therewithin.

11. A device as described in claim 10, wherein said mounting nose piece includes a cable mounting slot for the sideways insertion of said cable within said nose piece, whereby said slot in said nose piece may be aligned with said slot in said annulus member for the sideways mounting of said cable within said annulus member and said nose piece, and wherein said cable pulling device and said nose piece can be turned 90° to capture said cable within said annulus member and said nose piece.

12. A device as described in claim 7 wherein said cable pulling frame includes a plurality of frame members and a rotatable cable pulley being mounted to said frame members.

13. A device as described in claim 12 wherein said frame members are disposed to provide a cable mounting gap that allows said frame to be mounted to a side of said cable.

14. A device as described in claim 12 wherein said frame members are shaped as plates.

15. A device as described in claim 12 wherein said frame members are disposed to provide a cable engagement path in relation to said frame, such that a side portion of said cable can be mounted within said cable pulling frame and around said pulley.

16. A device as described in claim 15 wherein said frame includes a plurality of leg members that are engaged at an inner end thereof to a base member, and said leg members are engaged at an outer end thereof to further frame members that engage said pulley.

17. A device as described in claim 7 wherein said mole includes a nose portion being engagable to said cable, a tapered body portion and a replacement pipe engagement portion, said mole further including at least one blade, said tapered body portion acting to initially contact, fracture and expand said pipe for the replacement thereof with a length of replacement pipe, and said blade acting to cut pipe engagement devices encountered by said mole after said pipe has been expanded by said tapered body portion.

18. A device for the trenchless replacement of in-situ pipe, comprising:
   a mole;
   a length of cable, said cable being engagable to said mole;
   a cable pulling device including a cable engagement mechanism and a cable pulling device engagement means functioning to provide a mounting structure for said cable pulling device;
   said cable pulling device engagement means further including a reaction plate having an enlarged surface for disbursing a reaction force against a cable pulling force generated by said cable pulling device;
   a cable pulling frame, said cable pulling frame being mountable to said reaction plate and said cable pulling device being mountable to said cable pulling frame; and
   wherein said cable engagement mechanism includes at least one pair of cable engaging collets that function to engage said cable on a said pulling stroke and to release said cable on a said recovery stroke, and at least one further pair of collets that function to engage said cable on said recovery stroke and to release said cable on said pulling stroke, and wherein said cable pulling device is formed with a slotted cable insertion structure for the sideways insertion of said cable within said cable pulling device.

19. A device as described in claim 18 wherein said cable pulling frame includes a plurality of frame members and a rotatable cable pulley being mounted to said frame members; and wherein said frame members are disposed to provide a cable engagement path in relation to said frame, such that said cable can be sideways mounted within said cable pulling frame and around said pulley and into said cable pulling device.

20. A device as described in claim 19 wherein said mole includes a nose portion being engagable to said cable, a tapered body portion and a replacement pipe engagement portion, said mole further including at least one blade, said tapered body portion acting to initially contact, fracture and expand said pipe for the replacement thereof with a length of replacement pipe, and said blade acting to cut pipe engagement devices encountered by said mole after said pipe has been expanded by said tapered body portion.

21. A mole for use in the trenchless replacement of in-situ pipe, comprising, a nose portion being engagable to a cable, a tapered body portion and a replacement pipe engagement portion, the mole firther including at least one blade, said tapered body portion acting to initially contact, fracture and expand said in-situ pipe for the replacement thereof with a length of replacement pipe, and said blade acting to cut pipe engagement devices encountered by the mole after said pipe has been expanded by said tapered body portion; and wherein said blade includes a relatively thin portion that is disposable within said tapered body portion of the mole and an expanded portion that projects from said tapered body portion of the mole.

22. A mole for use in the trenchless replacement of in-situ pipe, comprising, a nose portion being engagable to a cable, a tapered body portion and a replacement pipe engagement portion, the mole further including at least one blade, said tapered body portion acting to initially contact, fracture and expand said in-situ pipe for the replacement thereof with a length of replacement pipe, and said blade acting to cut pipe engagement devices encountered by the mole after said pipe has been expanded by said tapered body portion; and wherein said blade is disposed within a slot formed in the mole, and wherein a rearward edge of said blade is formed with an angle of approximately 80° with respect to a bottom edge of said blade, and wherein said slot is formed with a shape that corresponds to said angle, such that said blade is held within said slot.

23. A mole for use in the trenchless replacement of in-situ pipe, comprising, a nose portion being engagable to a cable, a tapered body portion and a replacement pipe engagement portion, the mole further including at least one blade, said tapered body portion acting to initially contact, fracture and expand said in-situ pipe for the replacement thereof with a length of replacement pipe, and said blade acting to cut pipe engagement devices encountered by the mole after said pipe has been expanded by said tapered body portion;

a replacement pipe engagement sleeve member for the engagement of said replacement pipe with the mole, said sleeve member being formed with cylindrical sidewalls and an internal radially projecting wall portion having a bore formed therethrough;

and wherein the mole is formed with a rearwardly projecting threaded portion that projects through said bore, such that a threaded nut may be threadably engaged thereto to secure said sleeve upon the mole;

said sleeve further being adapted for the thermal pressure bonding of said replacement pipe thereto.

24. A method for the trenchless replacement of in-situ pipe, comprising the steps of:

exposing a first end of said pipe;

exposing a second end of said pipe;

disposing a pulling cable through said pipe between said first end and said second end;

engaging a mole to said cable at said first end;

engaging a cable pulling device to said cable at said second end, and installing a reaction plate at said second end, pulling said mole through said pipe utilizing said cable pulling device; and including the further steps of engaging said cable with a first pair of collets on a cable pulling stroke of said cable pulling device, and engaging said cable with a second pair of collets on a recovery stroke of said cable pulling device.

25. A method as described in claim 24 wherein said cable pulling device is a post tensioning ram (PTR).

26. A cable pulling device, comprising:

a first structural frame portion including at least two hydraulic cylinders, and a first pair of cable engaging collets that are engaged with said first structural portion and disposed to frictionally engage a portion of a cable that passes within said first pair of collets;

a second structural frame portion being movably engaged with said first structural frame portion, and a second pair of collets that are engaged with said second structural frame portion and disposed to frictionally engage a portion of said cable that passes within said second pair of collets.

27. A cable pulling device as described in claim 26 wherein a piston rod member projects from each of said at least two hydraulic cylinders, and wherein said second structural frame portion is fixedly engaged to said piston rod members; and wherein said hydraulic cylinders are operable to cause said first structural frame portion and said second structural frame portion to separate and to come together in a reciprocating manner; and wherein said first pair of collets is disposed to engage said cable when said first structural frame portion is separating from said second structural frame portion, and wherein said second pair of collets is disposed to engage said cable when said first structural frame portion is coming together with said second structural frame portion.

* * * * *

(12) EX PARTE REEXAMINATION CERTIFICATE (10623rd)
United States Patent
Carter et al.

(10) Number: US 6,305,880 C1
(45) Certificate Issued: Jun. 9, 2015

(54) DEVICE AND METHOD FOR TRENCHLESS REPLACEMENT OF UNDERGROUND PIPE

(75) Inventors: Robert Ward Carter, San Francisco, CA (US); Robert Williams Carter, Oakland, CA (US)

(73) Assignee: TRIC TOOLS, INC., Alameda, CA (US)

Reexamination Request:
No. 90/012,635, Sep. 14, 2012

Reexamination Certificate for:
Patent No.: 6,305,880
Issued: Oct. 23, 2001
Appl. No.: 09/350,948
Filed: Jul. 9, 1999

Related U.S. Application Data

(63) Continuation-in-part of application No. PCT/US98/00266, filed on Jan. 9, 1998.

(60) Provisional application No. 60/035,174, filed on Jan. 9, 1997.

(51) Int. Cl.
| | |
|---|---|
| *E02F 5/10* | (2006.01) |
| *E03F 3/06* | (2006.01) |
| *B23D 21/02* | (2006.01) |
| *E21B 7/20* | (2006.01) |
| *E21B 7/30* | (2006.01) |
| *E21B 29/10* | (2006.01) |
| *F16L 55/165* | (2006.01) |

(52) U.S. Cl.
CPC . *B23D 21/02* (2013.01); *E03F 3/06* (2013.01); *E21B 7/205* (2013.01); *E21B 7/30* (2013.01); *E21B 29/10* (2013.01); *F16L 55/1658* (2013.01)

(58) Field of Classification Search
USPC ................... 175/53; 405/184, 184.3
See application file for complete search history.

(56) References Cited

To view the complete listing of prior art documents cited during the proceeding for Reexamination Control Number 90/012,635, please refer to the USPTO's public Patent Application Information Retrieval (PAIR) system under the Display References tab.

*Primary Examiner* — Jimmy G Foster

(57) ABSTRACT

The basic features of the invention include a pipe parting mole, a length of cable that is engagable to the mole, a cable pulling device and a cable pulling device engagement frame that provides a mounting structure for the cable pulling device. The cable pulling device engagement frame generally includes a reaction plate and an annulus member for removably engaging the cable pulling device with the frame. The frame is configured for the sideways engagement of the cable within the frame and the annulus member. Two pairs of cable engagement collets are preferably utilized; a first pair being disposed within the cable pulling device to engage the cable on a pulling stroke, and a second pair may be disposed within the frame or the cable pulling device to engage the cable on a recovery stroke. The cable pulling device is preferably a post tensioning ram (PTR).

Attention is directed to the decision of US District Court California Northern, 3:12cv3490 *Tric Tools, Inc. v. TT Technologies, Inc. et al,* 6/24/2014 order construing claims. This reexamination may not have resolved all questions raised by this decision. See 37 CFR 1.552(c) for *ex parte* reexamination and 37 CFR 1.906(c) for *inter partes* reexamination.

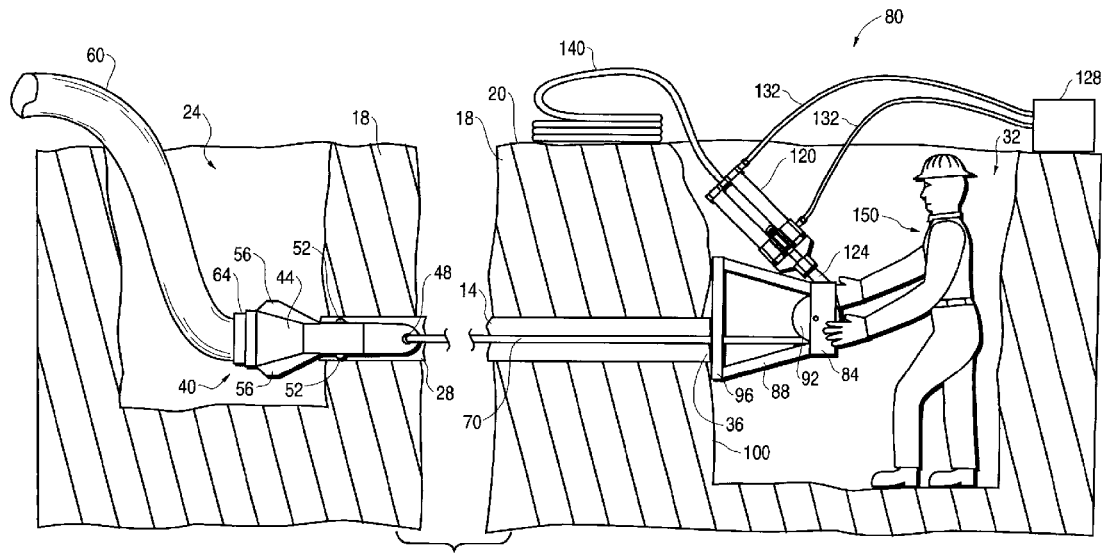

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7-17, 19, 20 and 22 is confirmed.

Claims 1-6, 18, 21 and 24-27 are cancelled.

Claim 23 was not reexamined.

* * * * *